(12) United States Patent
Kabasawa et al.

(10) Patent No.: US 8,531,399 B2
(45) Date of Patent: Sep. 10, 2013

(54) CONTROL APPARATUS, INPUT APPARATUS, CONTROL SYSTEM, CONTROL METHOD, AND HANDHELD APPARATUS

(75) Inventors: Hidetoshi Kabasawa, Saitama (JP); Takashi Masuda, Tokyo (JP); Kazuyuki Yamamoto, Kanagawa (JP); Kunihito Sawai, Kanagawa (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 12/526,315

(22) PCT Filed: Dec. 2, 2008

(86) PCT No.: PCT/JP2008/071907
§ 371 (c)(1),
(2), (4) Date: Jun. 25, 2010

(87) PCT Pub. No.: WO2009/072504
PCT Pub. Date: Jun. 11, 2009

(65) Prior Publication Data
US 2010/0265175 A1   Oct. 21, 2010

(30) Foreign Application Priority Data
Dec. 7, 2007   (JP) ................................. 2007-317659

(51) Int. Cl.
*G06F 3/033*   (2013.01)
(52) U.S. Cl.
USPC .......................................... 345/159; 345/419
(58) Field of Classification Search
USPC .................. 345/157–160, 419; 715/856–862
See application file for complete search history.

(56) References Cited

U.S. PATENT DOCUMENTS

| 5,896,123 A * | 4/1999 | Nagahara et al. ............. 715/858 |
| 7,343,026 B2 * | 3/2008 | Niwa et al. ..................... 382/103 |
| 8,310,445 B2 * | 11/2012 | Sato .............................. 345/157 |

FOREIGN PATENT DOCUMENTS

| JP | 05-143270 | 6/1993 |
| JP | 10-301753 | 11/1998 |
| JP | 2001-056743 | 2/2001 |
| JP | 2003-280785 | 10/2003 |
| JP | 2005-321870 | 11/2005 |
| JP | 3748483 | 2/2006 |

OTHER PUBLICATIONS

International Search Report dated Mar. 3, 2009, for corresponding Patent Application PCT/JP2008/071907.

* cited by examiner

*Primary Examiner* — Abbas Abdulselam
(74) *Attorney, Agent, or Firm* — K&L Gates LLP

(57) ABSTRACT

[Object] To provide a control apparatus, an input apparatus, a control system, a control method, and a handheld apparatus that are capable of preventing a deviation between a display position of a pointer and a relative position of the input apparatus when the input apparatus is moved out of a screen from an end portion of the screen, and with which a user can obtain an intuitional operational feeling.
[Solving Means] Not only on a real screen (95) but also on a virtual screen (105) set around the real screen (95), coordinates of a virtual pointer (2') are generated and stored. Accordingly, by moving an input apparatus (1) only by an amount that the input apparatus has moved outside the real screen (95), in an opposite direction, for example, a user can resume a movement of a pointer (2) that has reached a boundary line of the real screen (95), on the real screen (95). As a result, since coordinate values of the pointer are generated in a pseudo absolute coordinate system without being bound by a small screen, the user can operate the input apparatus (1) intuitionally without stress.

19 Claims, 21 Drawing Sheets

US 8,531,399 B2

CONTROL APPARATUS, INPUT APPARATUS, CONTROL SYSTEM, CONTROL METHOD, AND HANDHELD APPARATUS

CROSS REFERENCE TO RELATED APPLICATIONS

The present application is a National State of International Application No. PCT/JP2008/071907 filed on Dec. 2, 2008 and which claims priority to Japanese Patent Application No. 2007-317659 filed on Dec. 7, 2007, the entire contents of which are being incorporated herein by reference.

BACKGROUND

The present invention relates to a control apparatus for controlling display of a pointer on a screen, an input apparatus, a control system, a control method, and a handheld apparatus.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Patent Documents 1 and 2).

For example, there is disclosed a method of controlling a display position on a screen in which, when a mouse cursor is displayed at an end portion of a screen, an image including that mouse cursor is switched to an image including a virtual screen on an outer side of the screen (see, for example, Patent Document 3). Accordingly, an effect that a user can easily find the mouse cursor even when it is at the end portion of the screen can be obtained.

Patent Document 1: Japanese Patent Application Laid-open No. 2001-56743 (paragraphs [0030] and [0031], FIG. 3)
Patent Document 2: Japanese Patent No. 3,748,483 (paragraphs [0033] and [0041], FIG. 1)
Patent Document 3: Japanese Patent Application Laid-open No. Hei 10-301753 (paragraph [0036], FIG. 3)

In the techniques of Patent Documents 1 to 3 above, a position of a pointing device and a position on a screen are relative to each other. Therefore, regardless of a position of a hand of a user holding the pointing device, for example, a position of a pointer on a screen is determined. However, in a case where a direction that the pointing device is pointing is deviated from a display position of the pointer, stress may be caused, the tendency of which is considered to be high for people who wish to operate the pointer as if using a laser pointer, for example.

Moreover, there is also a problem that, unless an operation is made while being conscious of a position of the pointer, it is difficult for the user to grasp where the pointer that has moved out of the screen is. Especially when a menu graphic on the screen is displayed at the end portion of the screen, although the pointer is moved to the end portion of the screen and the pointer can be moved no further when the user is pointing a range of that menu graphic, the user tries to continue moving the pointing. Therefore, the display position of the pointer and the relative position of the pointing device are deviated and the user may thus feel awkwardness.

Therefore, it is desired to provide a control apparatus, an input apparatus, a control system, a control method, and a handheld apparatus that are capable of preventing a deviation between a display position of a pointer and a relative position of the input apparatus when the input apparatus is moved out of a screen from an end portion of the screen, and with which a user can obtain an intuitional operational feeling.

SUMMARY

According to an embodiment, there is provided a control apparatus controlling display of a pointer based on input information corresponding to a movement of an input apparatus, including: a generation means for generating first coordinate information indicating a position of the pointer that corresponds to the input information in a first coordinate system on a real screen displayed, and second coordinate information indicating a position of the pointer that corresponds to the input information in a second coordinate system associated with the first coordinate system on a virtual screen set around the real screen; and a display control means for controlling the display of the pointer on the real screen in accordance with the first coordinate information and the second coordinate information that have been generated.

In the embodiment, not only on the real screen but also on the virtual screen set on an outer side of the real screen, coordinate information (second coordinate information) of the pointer is generated. In other words, coordinate values of the pointer are generated in a pseudo absolute coordinate system without being bound by a small real screen. Accordingly, since it becomes possible to display the pointer again on the real screen from an integration position of movement coordinates on the virtual screen, the user can operate the input apparatus intuitionally without stress.

The second coordinate system being associated with the first coordinate system refers to a case where the second coordinate system overlaps the first coordinate system, a case where the second coordinate system is continuous with the first coordinate system, and the like.

Typically, scales of the first and second coordinate systems (scales of coordinates) are substantially the same, but they may be different.

The input apparatus may be a planar operation input apparatus or a 3-dimensional operation input apparatus to be described later.

The pointer is not limited to that having a finite form like a so-called cursor and includes those of various configurations with which a UI such as an icon displayed on the screen can be selected. For example, the pointer is not limited to that that is constantly displayed in a finite form and includes a configuration in which the position of the pointer becomes explicit when reaching an area in which a UI selection operation can be made.

The control apparatus further includes: a storage means for storing a virtual display area on the virtual screen out of a selection operation area as a target of a selection operation by the input apparatus, the virtual display area being stored in association with the second coordinate system; a judgment means for judging whether the generated second coordinate information is within the virtual display area; and a selection control means for controlling the target of the selection operation when the generated second coordinate information is within the virtual display area. Accordingly, by the user performing a pointing operation in the virtual display area of the selection operation area when performing a pointing operation on the virtual screen, a selection target can be selected.

In the present invention, the entire selection operation area may be the virtual display area. Alternatively, the display control means may generate image data of a real display area on the real screen adjacent to the virtual display area out of the selection operation area. Furthermore, the image data of the real display area may constantly be displayed on a part of the real screen. For example, assuming that, in a state where the pointer is displayed inside the selection operation area on the real screen, the user has performed pointing by operating the input apparatus so that the pointer moves out of the real screen to enter the virtual screen, since the selection operation area (virtual display area) is also set on the virtual screen in association with the second coordinate system in this case, the user can select the selection target by performing a pointing operation on the virtual screen.

The selection target in the selection operation area is, for example, a target to be a selection item for volume selection (volume control), channel selection for broadcast programs and the like, selection of reproduction/stop of an image, selection of fast-forwarding/rewinding, selection of each of images displayed flowingly on a real screen (so-called scroll function), and various other selection items of a menu screen.

During control by the selection control means, the pointer may be positioned anywhere on the virtual screen. The control by the selection control means may be continued even when, while the user is performing a selection operation, the position of the pointer moves out of the virtual display area of the selection operation area and enters an area other than the virtual display area on the virtual screen.

The real display area as the selection operation area on the real screen is not limited to a case where it is constantly displayed on the real screen. Specifically, the display control means may display the real display area on the real screen when the judgment means judges that the second coordinate information is within the virtual display area. Accordingly, it becomes possible to carry out display control of the selection operation area on which an intention of the user is reflected.

The selection control means variably controls a switching velocity in the selection operation in accordance with a distance between the generated second coordinate information and a boundary line at an end portion of the first coordinate system, the boundary line being a boundary between the first coordinate system and the second coordinate system. Accordingly, a selection operation that matches an intuition of the user becomes possible.

The switching velocity is, for example, in addition to a volume changing velocity if the selection target is volume and a channel changing velocity if the selection target is a channel, a reproduction velocity, a fast-forwarding velocity, and a scroll velocity.

The storage means stores the virtual display area of the selection operation area that is provided plurally, the plurality of virtual display areas being stored in association with the second coordinate system. In this case, the display control means may output image data of the virtual display area of each of the plurality of selection operation areas or output only image data of partial virtual display areas corresponding to the display position of the pointer out of the plurality of selection operation areas.

The display control means controls the display of the pointer so that, when the input information is changed from a first input value that corresponds to a position on a boundary line at an end portion of the first coordinate system, the boundary line being a boundary between the first coordinate system and the second coordinate system, to a second input value that corresponds to a position in an area of the second coordinate system adjacent to the boundary line, the pointer is displayed on the boundary line. In the present invention, when the second coordinate information is generated, the display control means may display the pointer while stopping it on the boundary line or display the pointer while moving it on the boundary line as in the invention to be described later.

For example, though the boundary line is typically a straight line when viewed macroscopically, it may be a curve instead. The first input value may be a value corresponding to coordinates on the boundary line or a value corresponding to coordinates outside the boundary line on the real screen.

The display control means controls the display of the pointer so that the pointer moves on the boundary line by updating the first coordinate values on the boundary line in accordance with the second coordinate information generated by the generation means. Accordingly, by checking the position of the pointer displayed on the boundary line on the real screen when performing pointing on the virtual screen using the input apparatus, the user can recognize where on the virtual screen the pointing is being made in a longitudinal or lateral direction.

The display control means may change a display form of the pointer on the boundary line in accordance with a change in the second input value. Accordingly, it becomes possible for the user to recognize that the pointer is positioned on the virtual screen and where on the virtual screen the pointer is positioned. The change in the display form of the pointer includes a change in a display color of the pointer, a deformation of the pointer, animation, and the like.

The display control means may generate a signal for executing processing for setting a state of the pointer to be uncorrelated to the input information when the input information is changed from a first input value of the input information that indicates that the pointer is positioned in the first coordinate system to a second input value of the input information that indicates that the pointer is positioned in the second coordinate system.

The uncorrelated processing is processing of hiding display of the pointer, processing of displaying and hiding the pointer (blinking), processing of stopping the pointer on the real screen, processing of changing the pointer to a specific symbol or figure, processing of making the pointer make a specific movement regardless of the input information, and the like.

The control apparatus further includes: a judgment means for judging whether the generated first coordinate information is on a boundary line at an end portion of the first coordinate system, the boundary line being a boundary between the first coordinate system and the second coordinate system; and a start means for causing the generation means to start generating the second coordinate information when the first coordinate information is on the boundary line.

For example, the control apparatus only needs to store coordinate data of the boundary line in advance, and the judgment means only needs to judge whether the generated first coordinate information matches any one of stored coordinate data.

Alternatively, the control apparatus may cause the generation means to start generating the second coordinate information when the first coordinate information generated as described above is within a second area of the selection operation area though not on the boundary line.

The control apparatus may further include a reception means for receiving a command signal output in accordance with a button operation of the input apparatus and a correction means for causing the position of the pointer to correspond to a predetermined reference position on the real screen based on the received command signal. For example, in a case where the input apparatus is operated such that a movement operation thereof becomes larger as the pointer comes closer to reaching an area on an outer side of the virtual screen, the position of the pointer on the screen may be deviated. In this case, by the correction means executing correction processing of the pointer position, the deviation of the display position of the pointer can be eliminated, and an intuitional pointer movement operability for the user can be secured.

The display control means may temporarily display the pointer with emphasis when the pointer is displayed at the reference position. Accordingly, it becomes possible to make the user recognize that the position of the pointer has been corrected. The emphasis display includes highlight display, enlargement display, and the like of a pointer.

For example, the input apparatus is a 3-dimensional operation input apparatus that generates a velocity value of the input apparatus based on at least one of an acceleration value of the input apparatus and an angular velocity value of the input apparatus and transmits information on the velocity value, and the control apparatus further includes a reception means for receiving the transmitted information on the velocity value as the input information.

When the velocity value is generated based on the angular velocity value alone, the angular velocity value can be output as the velocity value, for example.

When the velocity value is generated based on the acceleration value alone, the velocity value only needs to be generated by integrating the acceleration value.

When the input apparatus includes an angle sensor, an angular velocity value can be obtained by differentiating an angle value obtained by that angle sensor. When the input apparatus includes an angular acceleration sensor, an angular velocity value can be obtained by integrating an angular acceleration value obtained by that angular acceleration sensor.

The input apparatus is a 3-dimensional operation input apparatus that transmits information on at least one of an acceleration value of the input apparatus and an angular velocity value of the input apparatus, and the control apparatus further includes a reception means and a calculation means. The reception means receives the transmitted information on at least one of the acceleration value and the angular velocity value. The calculation means calculates a velocity value of the input apparatus based on the received information on at least one of the acceleration value and the angular velocity value. In this case, the generation means generates the first coordinate information and the second coordinate information that correspond to the input information while using information on the calculated velocity value as the input information.

According to the embodiment, there is provided an input apparatus controlling display of a pointer, including: a casing; an input information generation means for detecting a movement of the casing and generating input information corresponding to the movement of the casing; a generation means for generating first coordinate information indicating a position of the pointer that corresponds to the input information in a first coordinate system on a real screen displayed, and second coordinate information indicating a position of the pointer that corresponds to the input information in a second coordinate system associated with the first coordinate system on a virtual screen set around the real screen; and a display control means for controlling the display of the pointer on the real screen in accordance with the first coordinate information and the second coordinate information that have been generated.

According to the embodiment, there is provided a control system controlling display of a pointer, including an input apparatus and a control apparatus. The input apparatus includes a casing, an input information generation means for detecting a movement of the casing and generating input information corresponding to the movement of the casing, and a transmission means for transmitting the input information. The control apparatus includes a generation means for generating first coordinate information indicating a position of the pointer that corresponds to the input information in a first coordinate system on a real screen displayed, and second coordinate information indicating a position of the pointer that corresponds to the input information in a second coordinate system associated with the first coordinate system on a virtual screen set around the real screen, and a display control means for controlling the display of the pointer on the real screen in accordance with the first coordinate information and the second coordinate information that have been generated.

According to the embodiment, there is provided a control method controlling display of a pointer based on input information corresponding to a movement of an input apparatus, including: generating first coordinate information indicating a position of the pointer that corresponds to the input information in a first coordinate system on a real screen displayed; controlling the display of the pointer on the real screen in accordance with the first coordinate information and the second coordinate information that have been generated; and generating second coordinate information indicating a position of the pointer that corresponds to the input information in a second coordinate system associated with the first coordinate system on a virtual screen set around the real screen.

According to the embodiment, there is provided a handheld apparatus including: a casing; a display section; an input information generation means for detecting a movement of the casing and generating input information corresponding to the movement of the casing; a generation means for generating first coordinate information indicating a position of the pointer that corresponds to the input information in a first coordinate system on a real screen displayed on the display section, and second coordinate information indicating a position of the pointer that corresponds to the input information in a second coordinate system associated with the first coordinate system on a virtual screen set around the real screen; and a display control means for controlling display of the pointer on the real screen in accordance with the first coordinate information and the second coordinate information that have been generated.

As described above, according to the embodiment, a deviation between a display position of a pointer and a relative position of an input apparatus can be prevented from occurring when the input apparatus is moved out of a screen from an end portion of the screen, and a user can obtain an intuitional operational feeling.

Additional features and advantages are described herein, and will be apparent from, the following Detailed Description and the figures.

DETAILED DESCRIPTION

Hereinafter, embodiments will be described with reference to the drawings.

Figure 1:
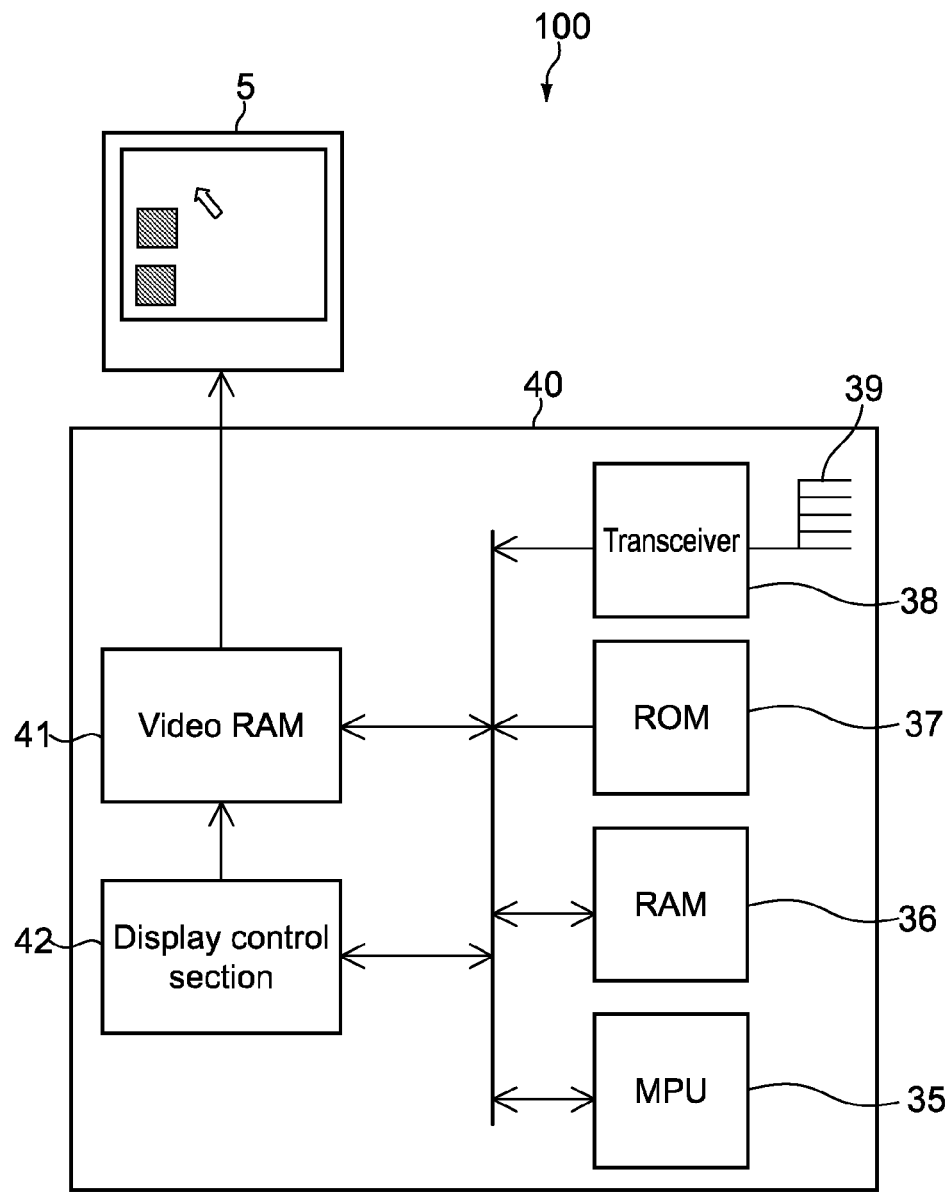
FIG. 1 A diagram showing a control system according to an embodiment of the present invention.

FIG. 1 is a diagram showing a control system according to an embodiment. A control system 100 includes a display apparatus 5, a control apparatus 40, and a 3-dimensional operation input apparatus 1.

Figure 2:
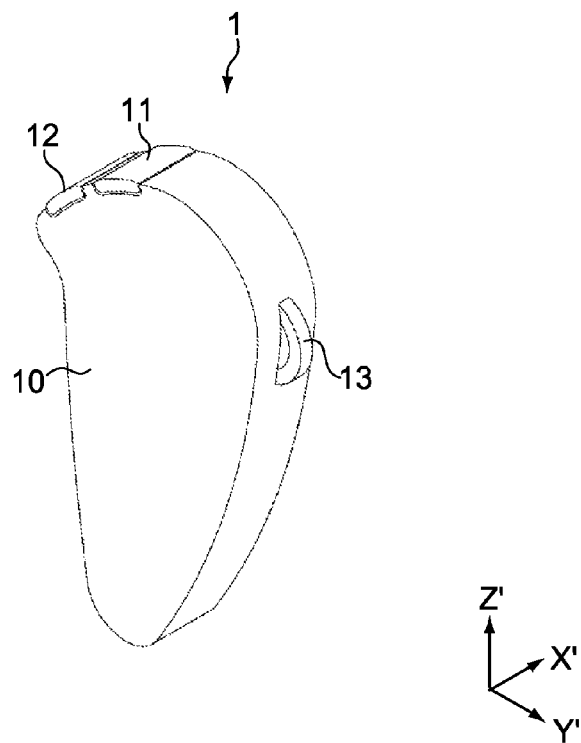
FIG. 2 A perspective diagram showing an input apparatus.

FIG. 2 is a perspective diagram showing the 3-dimensional operation input apparatus 1. In descriptions below, the 3-dimensional operation input apparatus will simply be referred to as input apparatus. The input apparatus 1 is of a size that a user is capable of holding. The input apparatus 1 includes a casing 10 and operation sections including two buttons 11 and 12 provided at an upper portion of the casing 10, a rotary wheel button 13, and the like. The button 11 disposed closer to the center of the upper portion of the casing 10 functions as a left button of a mouse as an input device for a PC, for example, and the button 12 adjacent to the button 11 functions as a right button of a mouse.

For example, "drag and drop" may be executed by moving the input apparatus 1 while pressing the button 11, a file may be opened by double-clicking the button 11, and a screen 3 may be scrolled by the wheel button 13. Locations of the buttons 11 and 12 and the wheel button 13, a content of a command issued, and the like can arbitrarily be changed.

Figure 3:
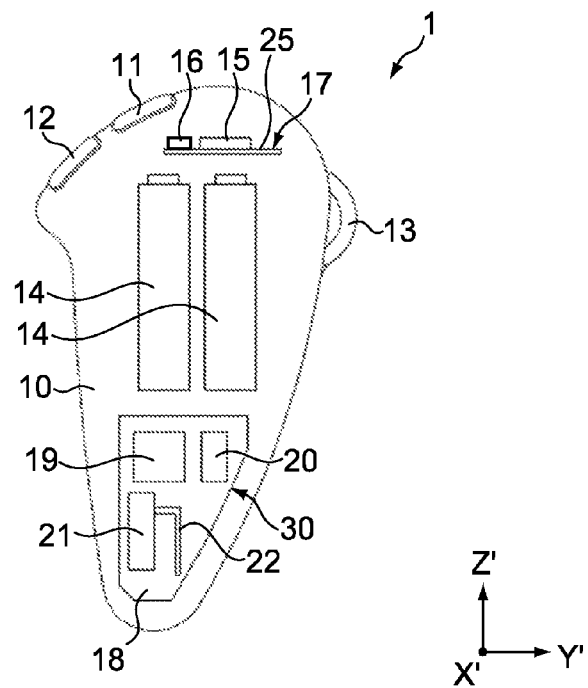
FIG. 3 A diagram schematically showing an internal structure of the input apparatus.
Figure 4:
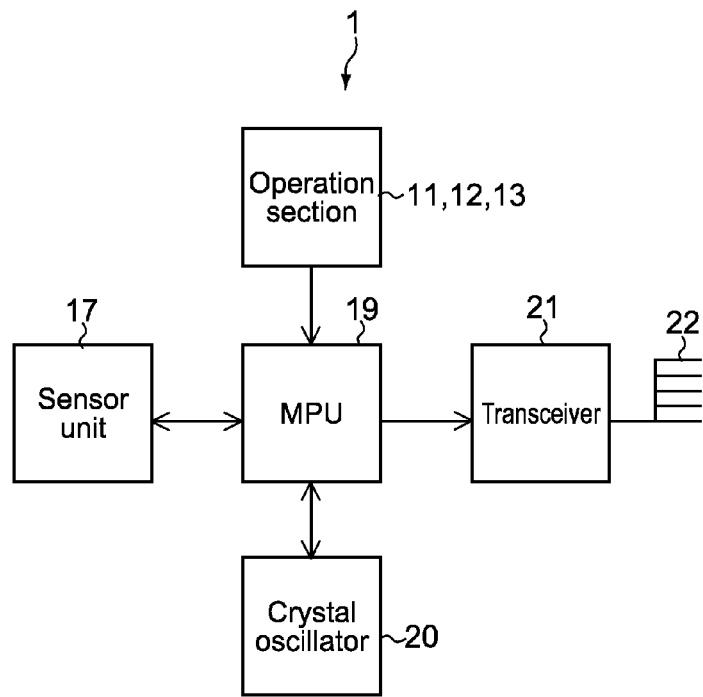
FIG. 4 A block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
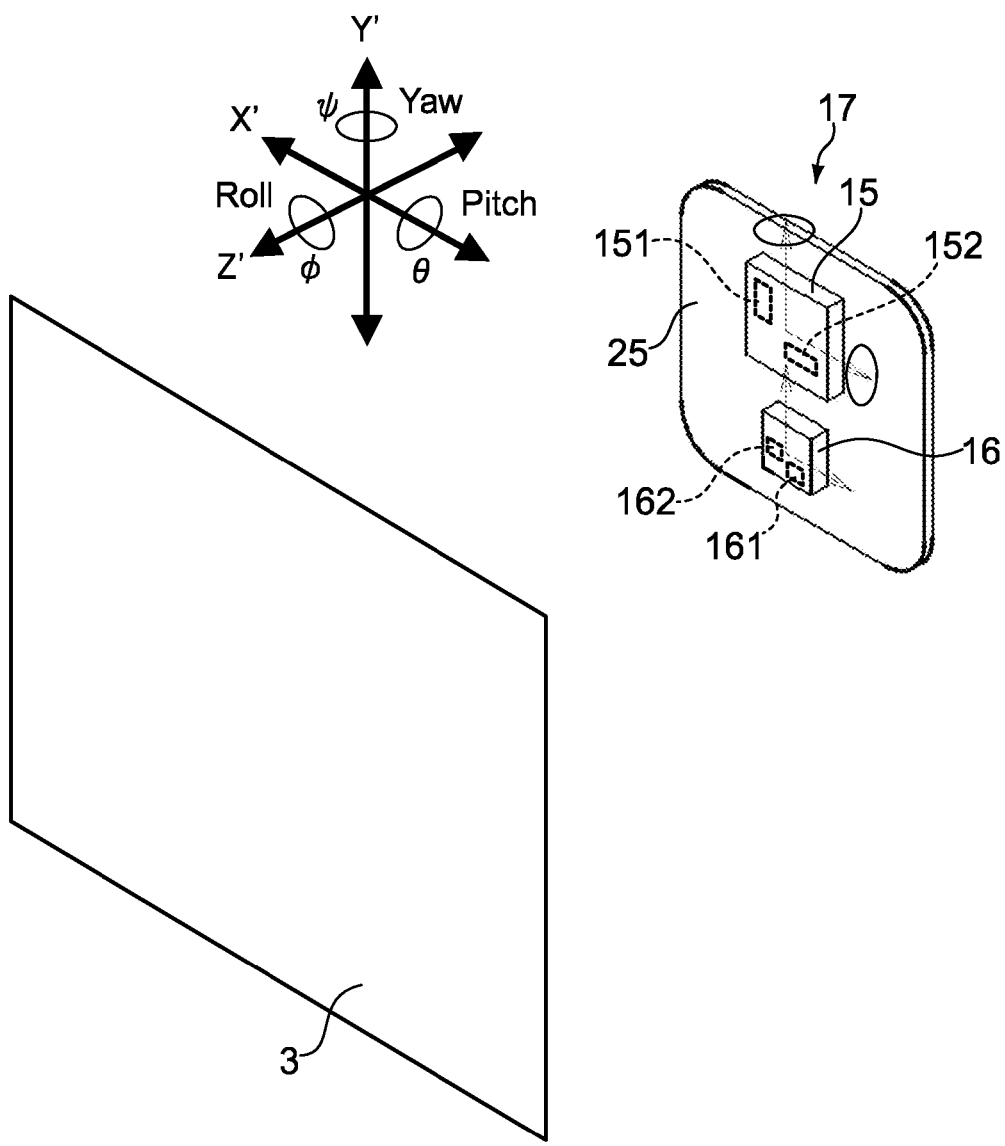
FIG. 8 A perspective diagram showing a sensor unit.

FIG. 8 is a perspective diagram showing the sensor unit 17. The sensor unit 17 includes an acceleration sensor unit 16 for detecting accelerations in different angles such as along two orthogonal axes (X' axis and Y' axis). Specifically, the acceleration sensor unit 16 includes two sensors, that is, a first acceleration sensor 161 and a second acceleration sensor 162. The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first and second angular velocity sensors 151 and 152, a vibration gyro sensor for detecting Coriolis force in proportion to an angular velocity is used. As each of the first and second acceleration sensors 161 and 162, any sensor such as a piezoresistive sensor, a piezoelectric sensor, or a capacitance sensor may be used. The angular velocity sensor 151 or 152 is not limited to the vibration gyro sensor, and a rotary top gyro sensor, a ring laser gyro sensor, a gas rate gyro sensor, and the like may also be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. In the specification, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. A plane including an X' axis (pitch axis) and a Y' axis (yaw axis) is an acceleration detection surface, that is, a plane substantially parallel to a main surface of the circuit board 25 (hereinafter, simply referred to as detection surface). Further, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) direction is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation sections, and the like, and executes various kinds of operational processing in order to generate predetermined control signals in response to those input signals. The memory may be provided separate from the MPU 19. A DSP (Digital Signal Processor), an FPGA (Field Programmable Gate Array), and the like may be used in place of the MPU 19.

Typically, the sensor unit 17 outputs analog signals. In this case, the MPU 19 includes an A/D (Analog/Digital) converter. Alternatively, the sensor unit 17 may be a unit that includes the A/D converter.

The transceiver 21 transmits, as RF radio signals, a control signal (input information) generated in the MPU 19 to the control apparatus 40 via the antenna 22. The transceiver 21 is also capable of receiving various signals transmitted from the control apparatus 40.

The crystal oscillator 20 generates clocks and supplies them to the MPU 19. As the batteries 14, dry cell batteries, rechargeable batteries, and the like are used.

The control apparatus 40 includes an MPU 35 (or CPU), a RAM 36, a ROM 37, a video RAM 41, a display control section 42, an antenna 39, and a transceiver 38.

The transceiver 38 receives the control signal (input information) transmitted from the input apparatus 1 via the antenna 39. The transceiver 38 is also capable of transmitting various predetermined signals to the input apparatus 1. The MPU 35 analyzes the control signal and executes various kinds of operational processing. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the apparatus dedicated to the input apparatus 1, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like, or an apparatus in which such a display and the control apparatus 40 are integrated.

Figure 5:
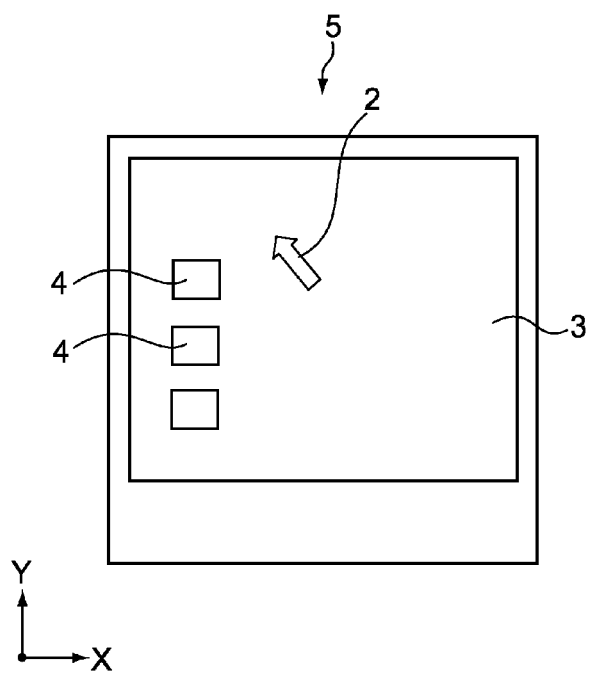
FIG. 5 A diagram showing an example of a screen displayed on a display apparatus.

FIG. 5 is a diagram showing an example of the screen 3 displayed on the display apparatus 5. UIs such as icons 4 and a pointer 2 are displayed on the screen 3. The icons are images on the screen 3 representing functions of programs, execution commands, file contents, and the like of the computer. It should be noted that on the screen 3, the horizontal direction is referred to as X-axis direction and the vertical direction is referred to as Y-axis direction.

Figure 6:
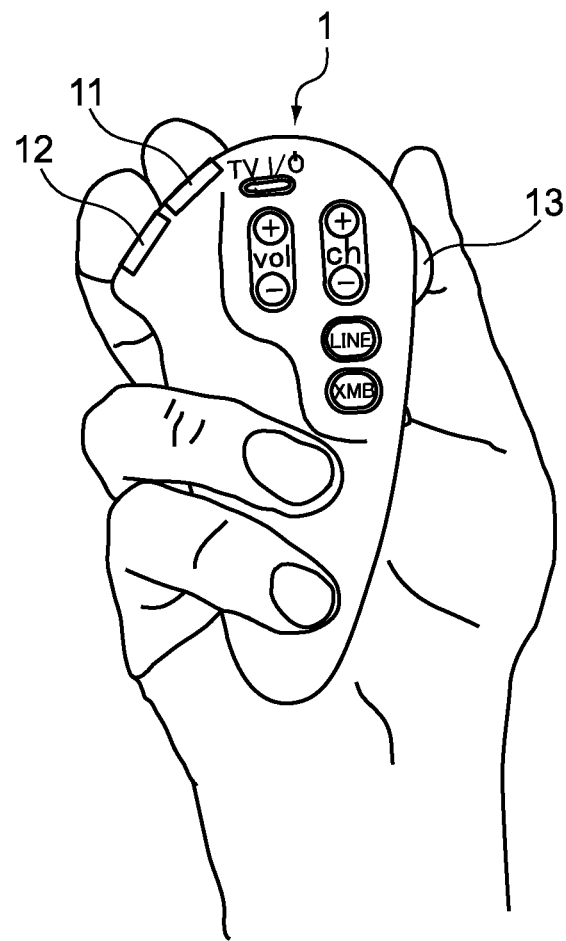
FIG. 6 A diagram showing a state where a user is holding the input apparatus.

FIG. 6 is a diagram showing a state where a user is holding the input apparatus 1. As shown in FIG. 6, the input apparatus 1 may include, in addition to the buttons 11, 12, and 13, operation sections including various operation buttons such as those provided to a remote controller for operating a television or the like and a power supply switch, for example. When the user moves the input apparatus 1 in the air or operates the operation sections while holding the input apparatus 1 as shown in the figure, input information thereof is output to the control apparatus 40, and the control apparatus 40 controls the UI.

Figure 7:
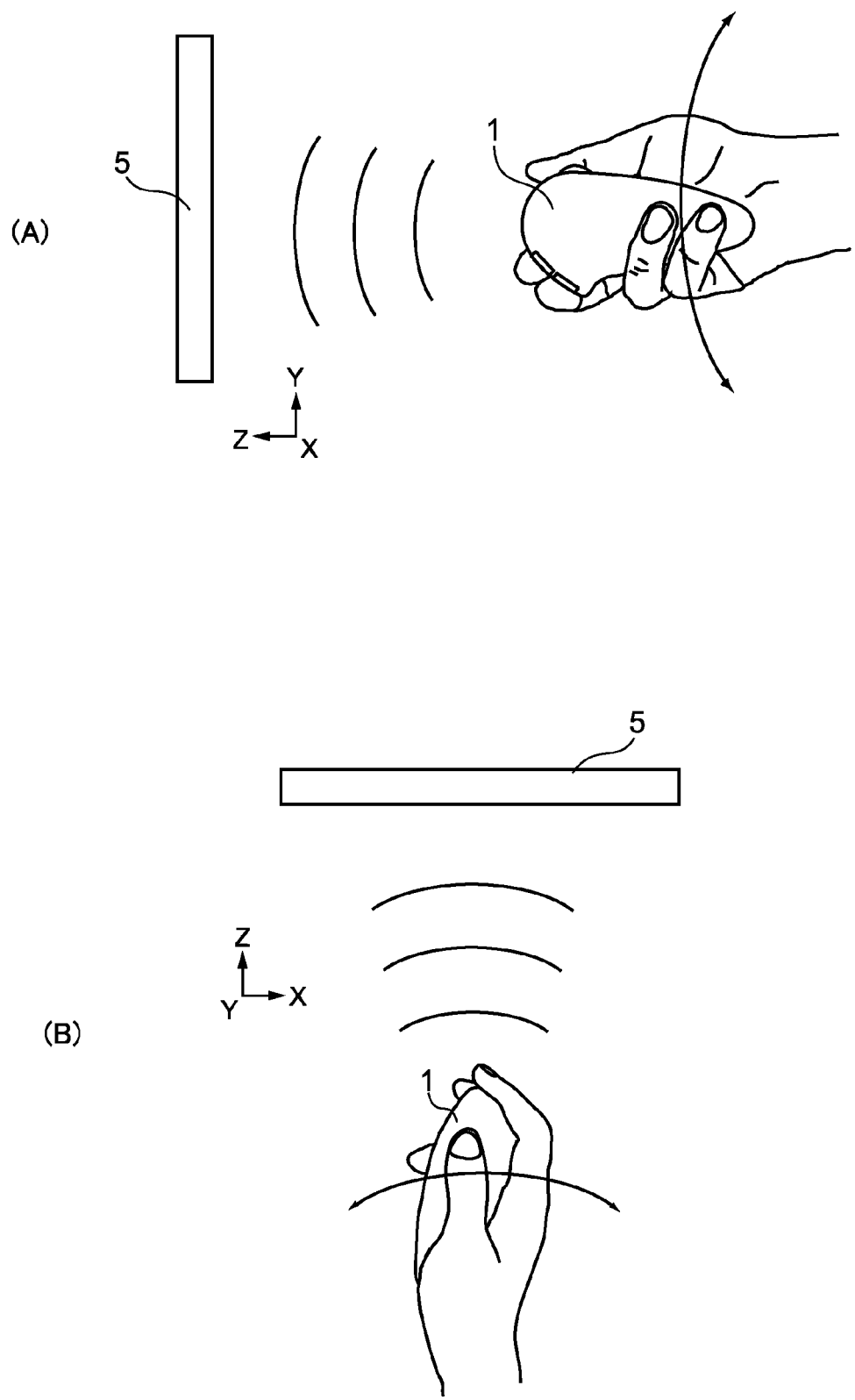
FIG. 7 Explanatory diagrams showing typical examples of ways of moving the input apparatus and ways a pointer moves on the screen accordingly.

Next, a description will be given on typical examples of ways of moving the input apparatus 1 and ways the pointer 2 moves on the screen 3 accordingly. FIG. 7 are explanatory diagrams therefor.

As shown in FIGS. 7(A) and 7(B), the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor unit 17 (see FIG. 8) is close to being in parallel with the screen 3 of the display apparatus 5, and the two axes as detection axes of the sensor unit 17 respectively correspond to the horizontal axis (X axis) (pitch axis) and the vertical axis (Y axis) (yaw axis) on the screen 3. Hereinafter, the position of the input apparatus 1 as shown in FIGS. 7(A) and 7(B) will be referred to as reference position.

As shown in FIG. 7(A), in the reference position, the user swings a wrist or an arm in the vertical direction, that is, the pitch direction. At this time, the second acceleration sensor 162 detects an acceleration (second acceleration) in the Y-axis direction, and the first angular velocity sensor 151 detects an angular velocity (first angular velocity) $\omega_\psi$ about the Y axis as an angle-related value. Based on those detection values, the control apparatus 40 controls display of the pointer 2 so that the pointer 2 moves in the Y-axis direction.

Meanwhile, as shown in FIG. 7(B), in the reference position, the user swings the wrist or the arm in the lateral direction, that is, the yaw direction. At this time, the first acceleration sensor 161 detects an acceleration (first acceleration) in the X-axis direction, and the second angular velocity sensor 152 detects an angular velocity (second angular velocity) $\omega_\theta$ about the X axis as the angle-related value. Based on those detection values, the control apparatus 40 controls display of the pointer 2 so that the pointer 2 moves in the X-axis direction.

Figure 9:
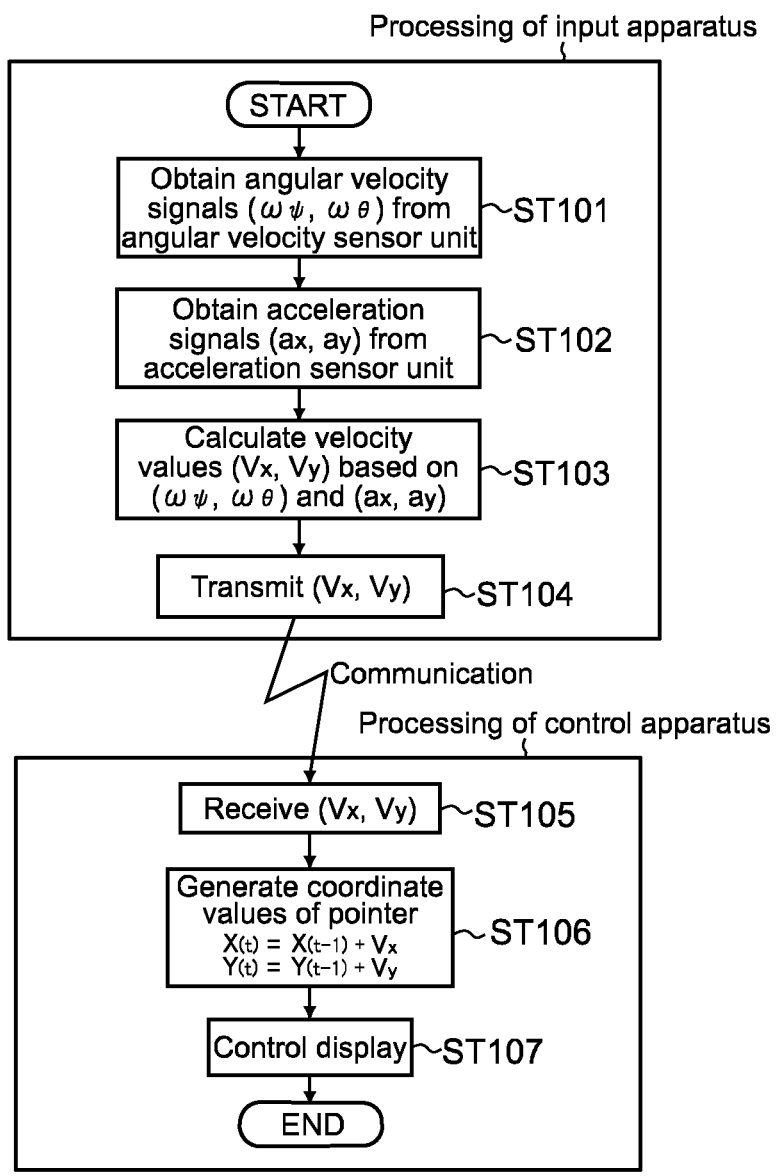
FIG. 9 A flowchart showing a basic operation of the control system.

Next, a basic operation of the control system 100 structured as described above will be described. FIG. 9 is a flowchart showing the operation.

Power of the input apparatus 1 is turned on. By the user turning on the power supply switch or the like provided to the input apparatus 1 or the control apparatus 40, for example, the power of the input apparatus 1 is turned on. When the power is turned on, biaxial angular velocity signals are output from the angular velocity sensor unit 15. The MPU 19 obtains a first angular velocity value $\omega_\psi$ and a second angular velocity value $\omega_\theta$ from the biaxial angular velocity signals (Step 101).

Figure 11:
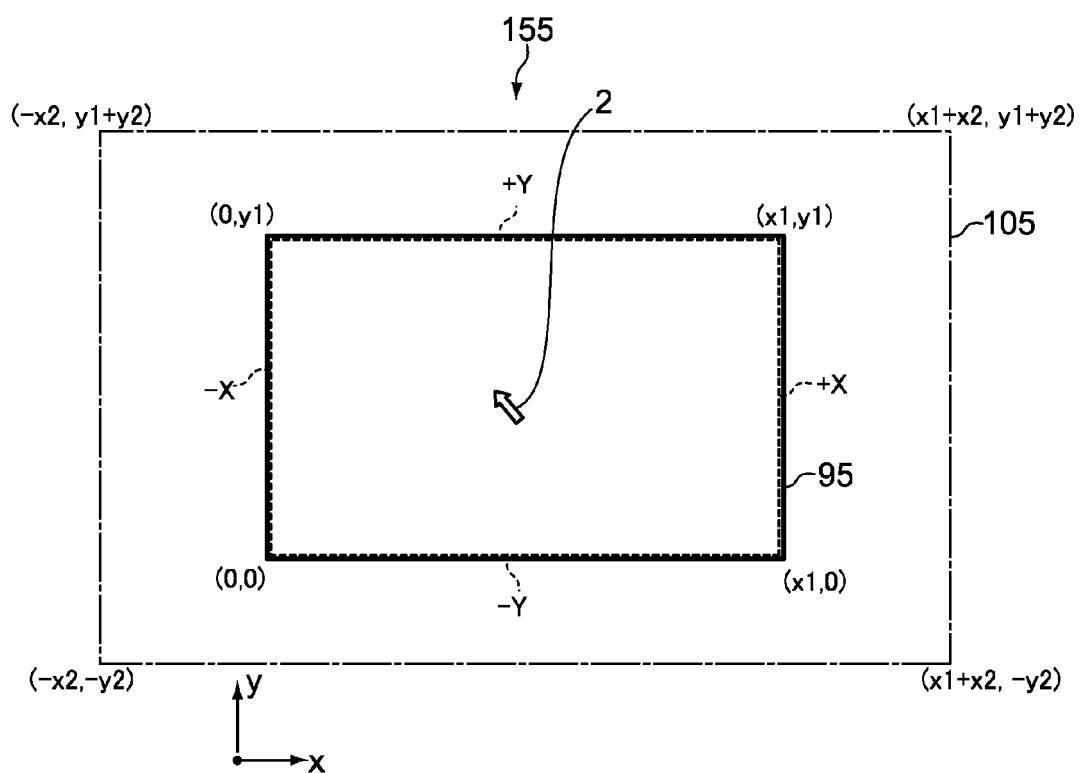
FIG. 11 A diagram showing an example of a screen displayed on the display apparatus under control of the control apparatus.
Figure 12:
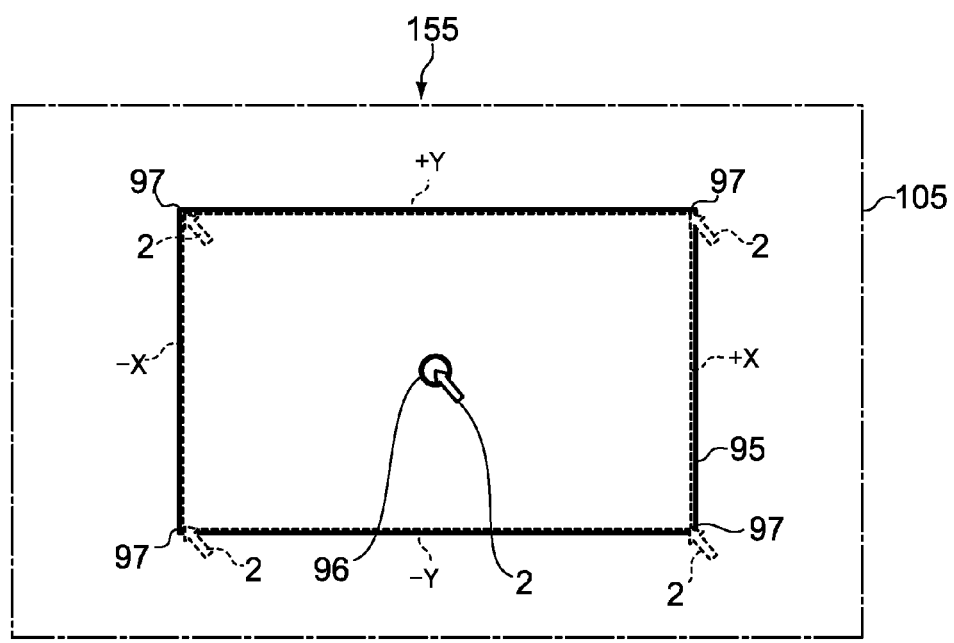
FIG. 12 A diagram for illustrating a calibration task for a user to determine, when a user uses the control system, a relationship between a spatial position of the input apparatus and a position of the pointer on an entire screen.

Further, upon turning on the power of the input apparatus 1, biaxial acceleration signals are output from the acceleration sensor unit 16. The MPU 19 obtains a first acceleration value $a_x$ and a second acceleration value $a_y$ from the biaxial acceleration signals (Step 102). The signals on the acceleration values are signals corresponding to the position of the input apparatus 1 at a point when the power is turned on (hereinafter, referred to as initial position). The initial position may be the reference position shown in FIG. 7, or may be a stand position as shown in FIG. 11 or 12.

It should be noted that the MPU 19 typically carries out Steps 101 and 102 in sync every predetermined clock cycle.

It should be noted that in FIG. 9 and the like, the acceleration signals are obtained by the acceleration sensor unit after the angular velocity signals are obtained by the angular velocity sensor unit. However, the order is not limited thereto, and the angular velocity signals may be obtained after the acceleration signals are obtained, or the acceleration signals and the angular velocity signals may be obtained in parallel (at the same time) (the same holds true for FIG. 10 below).

Based on the acceleration values ($a_x$, $a_y$) and the angular velocity values ($\omega_\psi$, $\theta_\theta$), the MPU 19 calculates velocity values (first velocity value $V_x$, second velocity value $V_y$) by a predetermined operation (Step 103). The first velocity value $V_x$ is a velocity value in a direction along the X axis and the second velocity value $V_y$ is a velocity value in a direction along the Y axis. In this point, at least the sensor unit 17 alone or the MPU 19 and the sensor unit 17 functions/function as an input information generation means for generating input information that corresponds to a movement of the casing 10 and is used for moving the pointer 2 on the screen 3.

As a method of calculating velocity values ($V_x$, $V_y$), in this embodiment, the MPU 19 divides the acceleration values ($a_x$, $a_y$) by angular acceleration values ($\Delta\omega_\psi$, $\Delta\omega_\theta$) to thus obtain radius gyrations ($R_\psi$, $R_\theta$) of the movement of the input apparatus 1. In this case, the velocity values ($V_x$, $V_y$) can be calculated by multiplying the radius gyrations ($R_\psi$, $R_\theta$) by the angular velocity values ($\omega_\psi$, $\omega_\theta$). The radius gyrations ($R_\psi$, $R_\theta$) may also be obtained by dividing acceleration change rates ($\Delta a_x$, $\Delta a_y$) by angular acceleration change rates ($\Delta(\Delta\omega_\psi)$, $\Delta(\Delta\omega_\theta)$).

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1.

It should be noted that the velocity values ($V_x$, $V_y$) do not always need to be calculated by the calculation method above. For example, the MPU 19 may calculate the velocity values by, for example, integrating the acceleration values ($a_x$, $a_y$) while using the angular velocity values ($\omega_\psi$, $\theta_\theta$) as an adminicle for the integration operation. Alternatively, it is also possible for the velocity values ($V_x$, $V_y$) to be calculated by simply integrating the acceleration values ($a_x$, $a_y$). Alternatively, the detected angular velocity values ($\omega_\psi$, $\omega_\theta$) may be used as they are as the velocity values ($V_x$, $V_y$) of the casing. It is also possible to obtain angular acceleration values ($\Delta\omega_\psi$, $\Delta\omega_\theta$) by temporally differentiating the detected angular velocity values ($\omega_\psi$, $\omega_\theta$), and use them as the acceleration values of the casing.

The MPU 19 transmits, as the input information, information on the calculated velocity values ($V_x$, $V_y$) to the control apparatus 40 via the transceiver 21 and the antenna 22 (Step 104).

The MPU 35 of the control apparatus 40 receives the information on the velocity values ($V_x$, $V_y$) via the antenna 39 and the transceiver 38 (Step 105). The input apparatus 1 transmits the velocity values ($V_x$, $V_y$) every predetermined clocks, that is, per unit time, so the control apparatus 40 can receive this and obtain displacement amounts in the X- and Y-axis directions per unit time.

The MPU 35 generates coordinate values (X(t), Y(t)) (coordinate information) of the pointer 2 on the screen 3 that correspond to the obtained displacement amounts in the X- and Y-axis directions per unit time by Equations (1) and (2) below (Step 106) (generation means). Based on the generated coordinate values, the MPU 35 controls display so that the pointer 2 moves on the screen 3 (Step 107).

$$X(t)=X(t-1)+V_x \qquad (1)$$

$$Y(t)=Y(t-1)+V_y \qquad (2)$$

In FIG. 9, the input apparatus 1 has calculated the velocity values ($V_x$, $V_y$) by carrying out main operations. In an embodiment shown in FIG. 10, the control apparatus 40 carries out the main operations.

Figure 10:
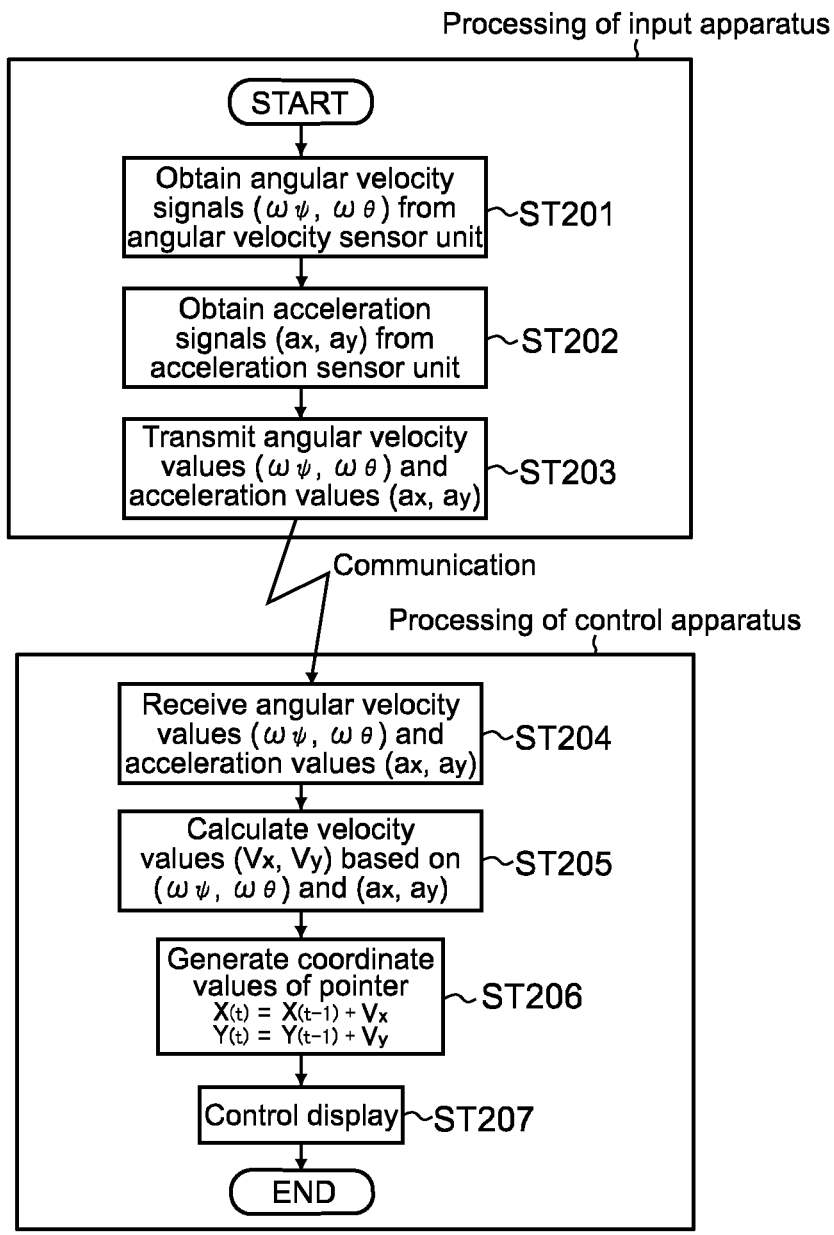
FIG. 10 A flowchart showing an operation of the control system in a case where a control apparatus carries out main operations.

As shown in FIG. 10, processes of Steps 201 and 202 are the same as those of Steps 101 and 102. The input apparatus 1 transmits to the control apparatus 40 information on detection values which are, for example, biaxial acceleration values and biaxial angular velocity values output from the sensor unit 17 (Step 203). The MPU 35 of the control apparatus 40 receives the information on the detection values (Step 204) and executes the same processes as Steps 103, 106, and 107 (Step 205 to 207).

Next, a main portion of the embodiment will be described.

FIG. 11 is a diagram showing an example of a screen displayed on the display apparatus 5, the display of which is controlled by the control apparatus 40.

The MPU 35 of the control apparatus 40 controls display of a real screen 95 and the pointer 2 on the real screen 95. The MPU 35 also controls a movement of the pointer 2 on a virtual screen 105 set around the real screen 95.

The real screen 95 is a screen that is actually displayed on the display apparatus 5. The virtual screen 105 is a virtual screen that is not displayed on the display apparatus 5 and stored by the control apparatus 40. The number of pixels of the real screen 95 is Xr×Yr, and the number of pixels of the virtual screen 105 is Xv×Yv.

(Xr, Yr) may variously be, for example, (1280, 1024), (1920, 1080), and (2048, 1152), but are not limited thereto.

(Xv, Yv) only need to be larger than (Xr, Yr). For example, when (Xr, Yr) are (800, 600), (Xv, Yv) are, for example, equal to or larger than (or smaller than) (1280, 1024). Alternatively, when (Xr, Yr) are (1920, 1080), (Xv, Yv) are (3920, 3080) or the like. However, a combination of (Xr, Yr) and (Xv, Yv) is not limited.

When generating coordinate values of the pointer 2 on the real screen 95, the MPU 35 generates coordinate values using a Cartesian coordinate system on the real screen 95 (first coordinate system). Similarly, when generating coordinate values of the pointer 2 on the virtual screen 105, the MPU 35 generates coordinate values using a Cartesian coordinate system on the virtual screen 105 (second coordinate system). At least coordinates on a boundary line (described later) at an end portion of the real screen 95 between the real screen 95 and the second coordinate system may be set so that the first and second coordinate systems overlap each other.

The second coordinate system is a coordinate system continuous with the first coordinate system (or relative to the first coordinate system). For example, assuming that coordinate values at four corners on the real screen 95 are (0, 0), (x1, 0), (0, y1), and (x1, y1) and coordinate values at four corners on the virtual screen 105 are (−x2, −y2), (x1+x2, −y2), (−x2, y1+y2), and (x1+x2, y1+y2), the virtual screen 105 becomes larger than the real screen 95 by an amount corresponding to the number of pixels several times larger than x2 in the lateral direction and larger than the real screen 95 by an amount corresponding to the number of pixels several times larger than y2 in the longitudinal direction. The MPU 35 stores data of the first and second coordinate systems of the real screen 95 and the virtual screen 105, respectively, in the ROM 37, the RAM 36, or other memories.

The MPU 35 may alternatively store in the memory the data of both coordinate systems as coordinate systems having at least a partial area of the second coordinate system overlapping the first coordinate system. In other words, the memory may store the data of the first coordinate system of the real screen 95 and the data of the second coordinate system of the virtual screen 105 including a part (e.g., boundary line at end portion) or all of a coordinate range of the real screen 95.

It should be noted that hereinafter, a screen including the real screen 95 and the virtual screen 105 will be referred to as entire screen 155.

FIG. 12 is a diagram for illustrating a calibration task for determining, when a user uses the control system 100, a relationship between a spatial position of the input apparatus 1 and a position of the pointer 2 on the entire screen 155.

For example, the MPU 35 of the control apparatus 40 displays a predetermined figure or mark (hereinafter, referred to as calibration mark) 96 on a part of the real screen 95, for example, at a center position. The calibration mark 96 is displayed in a predetermined pixel range (area). A display position (reference position) of the calibration mark 96 is not limited to the center position of the real screen 95 and may be, for example, at least one of four corners 97 of the real screen 95. The display position of the calibration mark 96 may alternatively be two or more including the center position and at least one of the four corners 97.

For example, by a calibration that uses at least two calibration marks 96, the following effect can be obtained. By comparing the number of pixels between the two points and a movement velocity of the pointer (or integration value thereof) between the two points, the MPU 35 can calibrate, for example, the number of pixels corresponding to that movement amount with respect to the movement velocity of the input apparatus 1. Specifically, it becomes possible to calibrate how long a distance (number of pixels) the pointer moves when the input apparatus 1 is moved by what velocity (or how long a distance) by the user. As a result, an operational feeling of the user can be additionally improved.

By holding the input apparatus 1 in the reference position as shown in FIG. 7 and moving the casing 10, for example, the user aims the input apparatus 1 at the display position of the calibration mark 96. By the user pressing, for example, the button 11 or other buttons while aiming the input apparatus 1 at the calibration mark 96, a determination command signal is generated from the input apparatus 1.

The determination command signal is transmitted to the control apparatus 40 to be received by the control apparatus 40. Upon receiving the determination command signal in a state where the input apparatus 1 is aimed at the calibration mark 96, the MPU 35 of the control apparatus 40 executes processing for making the position of the pointer 2 correspond to the calibration mark 96 (correction means). As a result, the pointer 2 is displayed at (or moved to) the display position of the calibration mark 96. The MPU 35 stores a signal indicating that the current position of the pointer 2 is the center position of the real screen 95 in the memory. Accordingly, the MPU 35 controls a movement of the pointer 2 assuming that the movement of the input apparatus 1 indicates a pseudo absolute position in space with respect to the real screen 95. In other words, though there is a relative positional relationship between the input apparatus 1 and the entire screen 155, the input apparatus 1 has an absolute positional relationship in space with respect to the real screen 95.

It should be noted that, by the same method as described above, it is also possible to correct, by displaying the calibration mark at any or all of the four corners of the real screen 95, the display position of the pointer 2 at that(those) position(s).

The MPU 35 may temporarily display the pointer 2 with emphasis when the pointer 2 is displayed on the calibration mark 96. As a result, it is possible to make the user recognize that the display position of the pointer 2 has been corrected. The emphasis display of the pointer 2 includes highlight display, enlargement display, and the like of the pointer 2.

It should be noted that the control apparatus 40 obtains device information (screen information, other bibliographic information, etc.) of the display apparatus 5 at a point when it is electrically connected to the display apparatus 5, for example.

Figure 13:
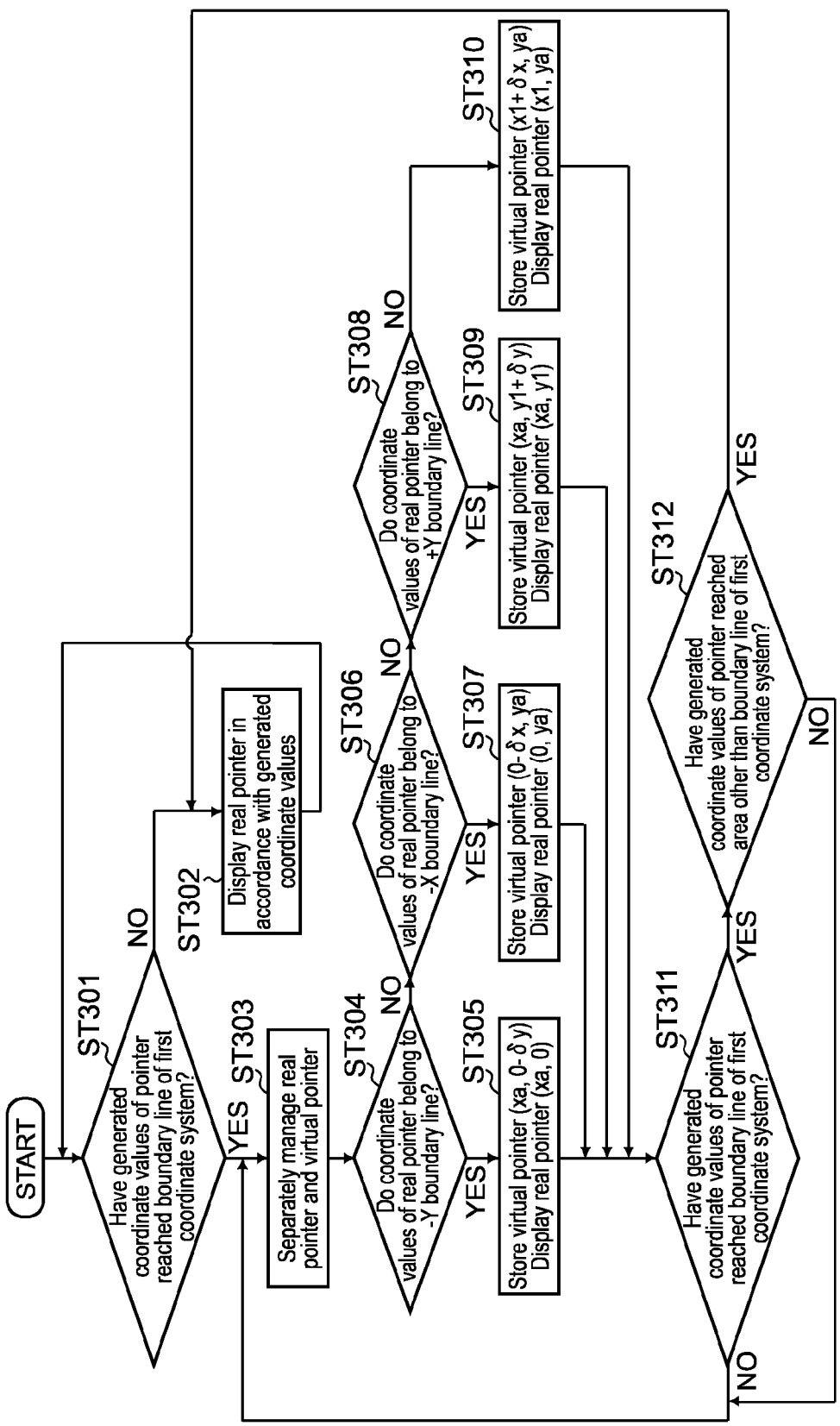
FIG. 13 A flowchart showing an operation carried out at a time when the control apparatus controls a movement of the pointer using a real screen and a virtual screen.

Next, an operation carried out at a time when the control apparatus 40 controls the movement of the pointer 2 using the real screen 95 and the virtual screen 105 as described above will be described. FIG. 13 is a flowchart thereof.

Upon ending the calibration as described above, the MPU 35 judges whether coordinate values of the pointer 2 generated based on the input information from the input apparatus 1 have reached a boundary line of the first coordinate system (Step 301).

The boundary line is a line at an end portion of the first coordinate system between the first coordinate system and the second coordinate system, which is, in FIG. 11, any one of two horizontal lines (+Y and −Y) between the coordinates (0, 0) and (x1, 0) and coordinates (0, y1) and (x1, y1), respectively, and two vertical lines (−X and +X) between the coordinates (0, 0) and (0, y1) and coordinates (x1, 0) and (x1, y1), respectively.

The boundary line may alternatively be set as a line having a certain amount of width, that is, a line having a width corresponding to two or more pixels.

When the coordinate values of the pointer 2 have not reached the boundary line of the first coordinate system in Step 301, the MPU 35 advances to Step 302. In Step 302, the MPU 35 displays the pointer 2 in accordance with the coordinate values since the pointer 2 is on the first coordinate system.

To help understand descriptions below, the pointer 2 displayed on the real screen 95 may be referred to as real pointer. In addition, a pointer managed on the virtual screen 105 may be referred to as virtual pointer 2'.

When the coordinate values of the pointer 2 have reached the boundary line of the first coordinate system in Step 301, the MPU 35 manages the real pointer 2 and the virtual pointer 2' separately (Step 303). In this embodiment, in Step 303, the MPU 35 starts generating coordinate values of the virtual pointer 2' in the second coordinate system and manages coordinates of the virtual pointer 2' in the second coordinate system while displaying the real pointer on the boundary line.

The MPU 35 judges which of the coordinate values respectively belonging to the four boundary lines −Y, −X, +Y, and +X the coordinate values of the pointer 2 are (Steps 304, 306, and 308).

When the coordinate values belong to the boundary line −Y, coordinate values (xa, 0−δy) of the virtual pointer 2' are stored in the memory. Moreover, in this case, display is made with the coordinate values of the real pointer 2 set to (xa, 0) (Step 305). Here, xa is a value that varies.

Figure 15:
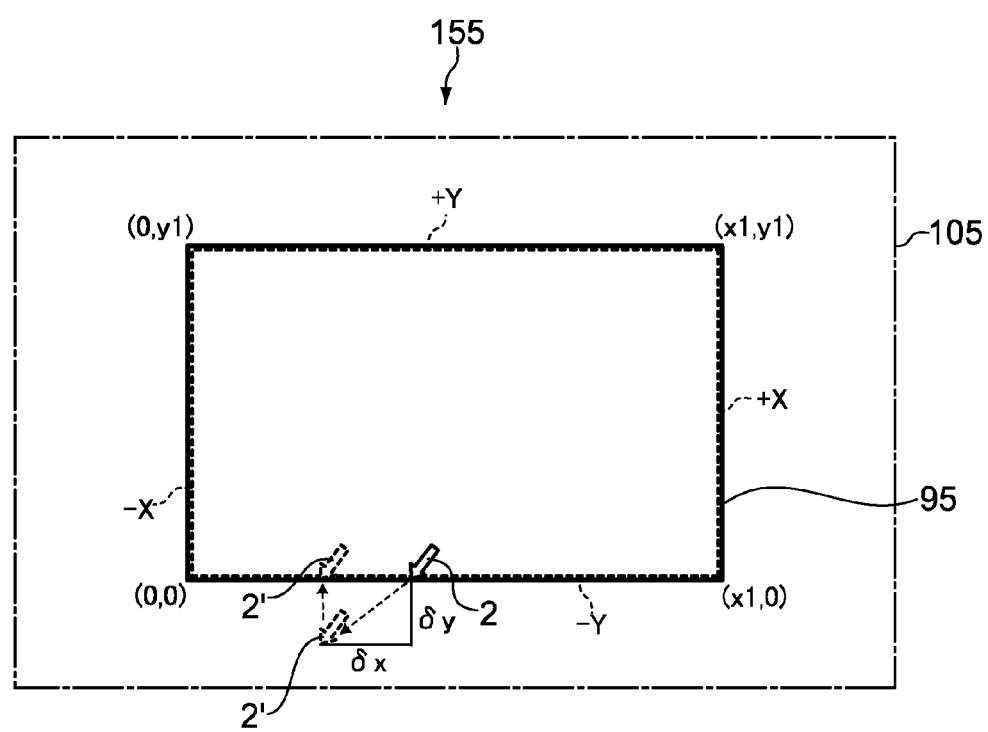
FIG. 15 A diagram showing movements of the virtual pointer and the real pointer at a time when generated coordinate values of the pointer have crossed over a boundary line +Y from the first coordinate system and entered the second coordinate system.

FIG. 15 is a diagram showing movements of the virtual pointer 2' and the real pointer 2 at a time when, for example, the coordinate values have crossed over the boundary line −Y from the first coordinate system and entered the second coordinate system (corresponding to Steps 304 and 305). A state where the real pointer 2 on the boundary line −Y (x, 0) has moved only by −δx, −δy is shown in this case. Also in this case, the MPU 35 controls display of the pointer 2 so that the coordinate values of the real pointer 2 move from (x, 0) to (x−δx, 0).

When the coordinate values belong to the boundary line −X, the coordinate values (0−δx, ya) of the virtual pointer 2' are stored in the memory. Moreover, in this case, display is made with the coordinate values of the real pointer 2 set to (0, ya) (Step 307). Here, ya is a value that varies.

Figure 14:
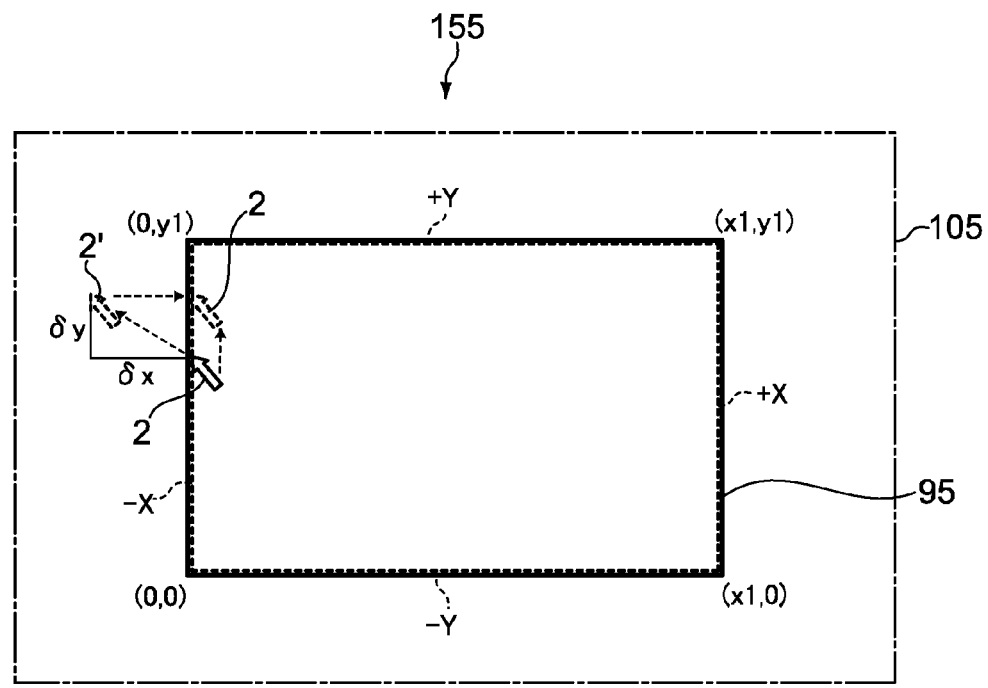
FIG. 14 A diagram showing movements of a virtual pointer and a real pointer at a time when generated coordinate values of the pointer have crossed over a boundary line −X from a first coordinate system and entered a second coordinate system.

FIG. 14 is a diagram showing movements of the virtual pointer 2' and the real pointer 2 at a time when, for example, the generated coordinate values have crossed over the boundary line −X from the first coordinate system and entered the second coordinate system (corresponding to Steps 306 and 307). A state where the real pointer 2 on the boundary line −X (0, y) has moved only by −δx, +δy is shown in this case (a state where a movement is made from coordinate values corresponding to a first input value of the input information from the input apparatus 1 to coordinate values corresponding to a second input value is shown). In this case, the MPU 35 controls display of the pointer 2 so that the coordinate values of the real pointer 2 move from (0, y) to (0, y+δy). In other words, the coordinate values of the real pointer 2 on the boundary line −X are updated in association with an update of storage of the coordinate values of the virtual pointer 2' on the virtual screen 105.

Accordingly, by checking the position of the pointer 2 displayed on the boundary line on the real screen 95 when performing pointing on the virtual screen 105, the user can recognize where on the virtual screen 105 the pointing is being made in a longitudinal or lateral direction.

Referring back to FIG. 13, when the coordinate values belong to the boundary line +Y in Step 308, coordinate values (xa, y1+δy) of the virtual pointer 2' are stored in the memory. Moreover, in this case, display is made with the coordinate values of the real pointer 2 set to (xa, y1). Here, xa is a value that varies.

When the coordinate values belong to the boundary line +X, coordinate values (x1+δx, ya) of the virtual pointer 2' are stored in the memory. Moreover, in this case, display is made with the coordinate values of the real pointer 2 set to (x1, ya) (Step 310). Here, ya is a value that varies.

The MPU 35 judges whether coordinate values of the pointer that have been generated next have reached the boundary line of the first coordinate system from the second coordinate system (Step 311). When judged NO, the processes from Step 303 are repeated. In subsequent Steps 305, 307, 309, and 310, the coordinate values of the virtual pointer 2' stored in the memory are updated to new coordinate values of the virtual pointer 2'.

When judged YES in Step 311, the MPU 35 judges whether the coordinate values have reached an area other than the boundary line of the first coordinate system (Step 312) and when judged YES, repeats the processes from Step 302.

Figure 16:
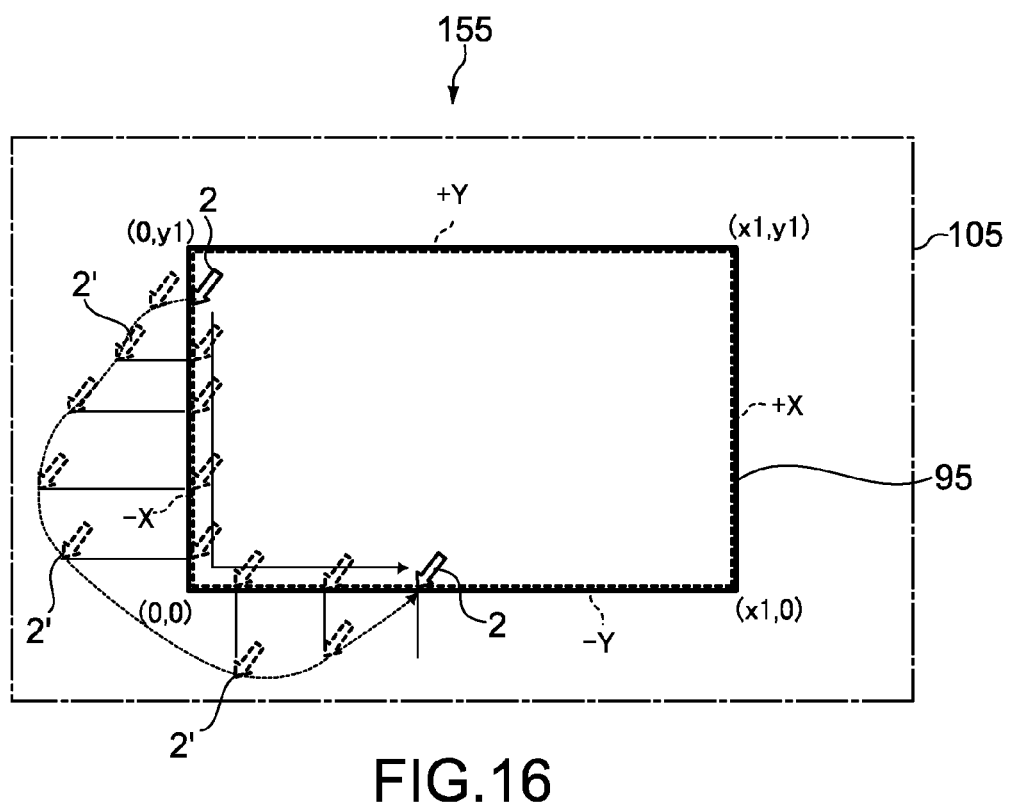
FIG. 16 A diagram showing movements of the virtual pointer and the real pointer at a time when generated coordinate values of the pointer have crossed over the boundary line −X from the first coordinate system and entered the second coordinate system, and have reached an area below the boundary line +Y in the second coordinate system.

FIG. 16 is a diagram showing movements of the virtual pointer 2' and the real pointer 2 at a time when, for example, the coordinate values have crossed over the boundary line −X from the first coordinate system and entered the second coordinate system, and have reached an area below the boundary line −Y in the second coordinate system. This state corresponds to Steps 306 to 309 above.

As described above, the coordinates of the virtual pointer 2' are generated not only on the real screen 95 but also on the virtual screen 105 set around the real screen 95 and stored. Accordingly, by moving the input apparatus 1 only by an amount that the input apparatus has moved outside the real screen 95, in an opposite direction, for example, the user can resume the movement of the pointer 2 that has reached the boundary line of the real screen 95, on the real screen 95. As a result, a deviation between the display position of the pointer 2 and a relative position of the input apparatus 1 can be prevented from occurring. In other words, since coordinate values of the pointer are generated in a pseudo absolute coordinate system without being bound by a small screen, the user can operate the input apparatus 1 intuitionally without stress.

Moreover, in a case where the input apparatus is operated such that a movement operation thereof becomes larger as the pointer comes closer to reaching an area on an outer side of the virtual screen, the position of the pointer on the screen is deviated, for example. In this case, by the correction means executing correction processing of the pointer position, the deviation of the display position of the pointer can be eliminated, and an intuitional pointer movement operability for the user can be secured.

Figure 17:
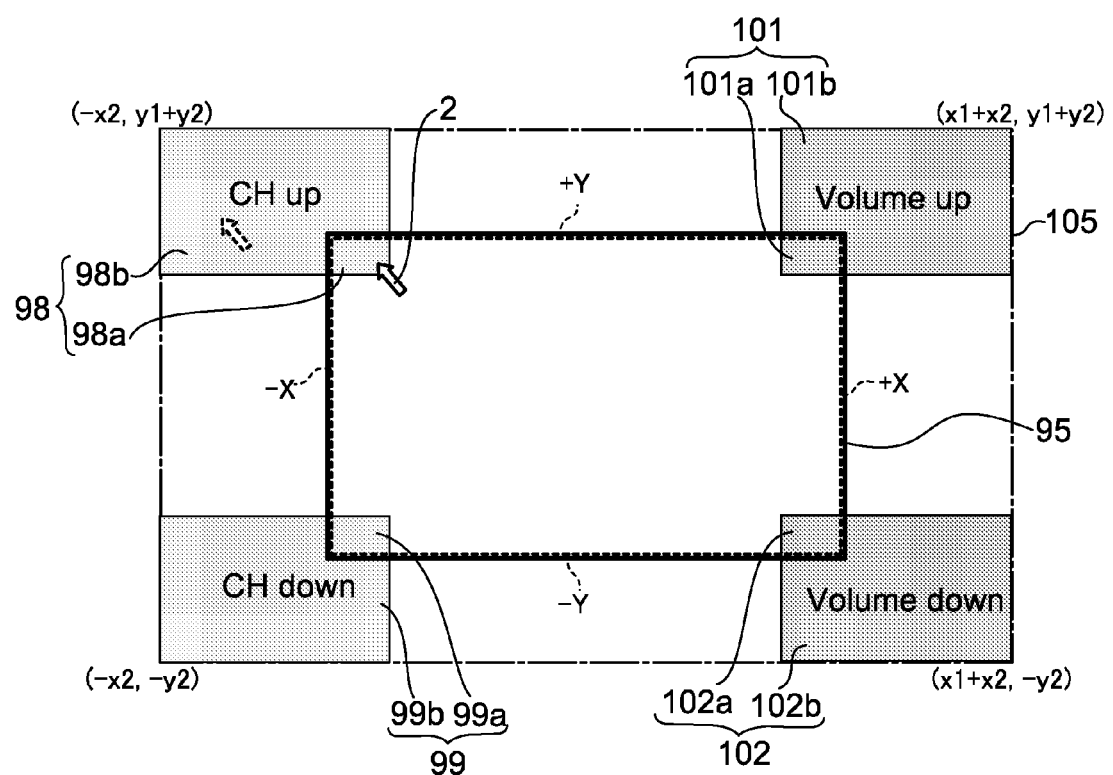
FIG. 17 A diagram showing a screen that the control apparatus causes the display apparatus to display according to another embodiment.

Next, another embodiment will be described. FIG. 17 is a diagram showing a screen that the control apparatus 40 causes the display apparatus 5 to display according to another embodiment.

The real screen 95 that the control apparatus 40 causes the display apparatus 5 to display includes, at four corners thereof, predetermined icons 98a, 99a, 101a, and 102a. Each of the plurality of icons 98a, 99a, 101a, and 102a is image data of a part of a selection operation area (real display area) that is to be a target of a selection operation made by the user using the input apparatus 1.

The control apparatus 40 stores, in the RAM 36, the ROM 36, or other storage devices, partial selection operation areas (virtual display areas) 98b, 99b, 101b, and 102b that are continuous with the icons 98a, 99a, 101a, and 102a, respectively, in association with the second coordinate system of the virtual screen 105. The control apparatus 40 generates image data displayed in the selection operation areas 98, 99, 101, and 102 each including the real display area and the virtual display area. In this embodiment, the icons 98a, 99a, 101a, and 102a are constantly displayed on the real screen 95, though not limited thereto as will be described later.

The selection operation area 98 is an operation area for channel-up for television broadcasts and the like. The selection operation area 99 is an operation area for channel-down. The selection operation area 101 is an operation area for volume-up of audio outputs. The selection operation area 102 is an operation area for volume-down of audio outputs. The selection operation areas 98, 99, 101, and 102 are set to be rectangular, for example. However, outer shapes thereof may include curved portions, and a setting change can be made to various shapes.

Figure 18:
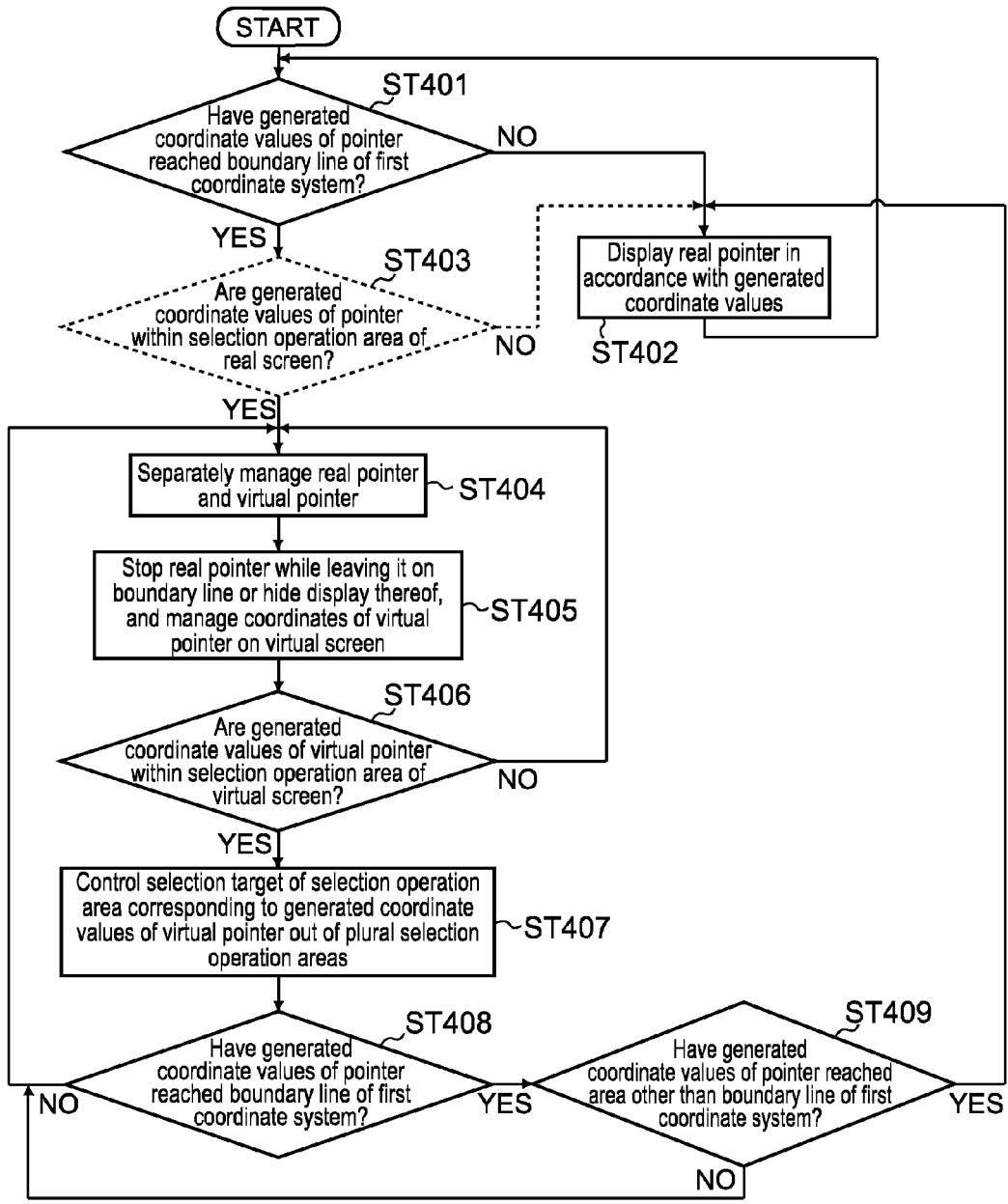
FIG. 18 A flowchart showing an operation of the control apparatus for controlling display of the screen.

FIG. 18 is a flowchart showing an operation of the control apparatus 40 according to this embodiment.

The MPU 35 judges whether the generated coordinate values of the pointer 2 have reached the boundary line of the first coordinate system after the calibration described above (Step 401). When judged NO, the MPU 35 advances to Step 402 as in the processing of FIG. 13.

Here, the MPU 35 may alternatively judge whether the coordinate values are within one of the areas of the icons 98a, 99a, 101a, and 102a (Step 403). In this case, the MPU 35 only needs to advance to Step 402 when the coordinate values are not within those areas. The judgment process of Step 403 may be omitted.

When judged YES in Step 401, the MPU 35 advances to Step 404 and starts generating coordinate values of the virtual pointer 2' in the second coordinate system as in the processing of FIG. 13. In Step 405, the MPU 35 executes processing of stopping the real pointer 2 while leaving it on the boundary line or hiding display thereof.

The MPU 35 next judges whether the generated coordinate values of the virtual pointer 2' are within any one of the selection operation areas 98b, 99b, 101b, and 102b set on the virtual screen 105 (Step 406) (judgment means). When judged NO, the MPU 35 repeats the processes from Step 404.

When judged YES in Step 406, the MPU 35 controls a selection target in the selection operation area 98b, 99b, 101b, or 102b that corresponds to the generated coordinate values of the virtual pointer 2' (Step 407) (selection control means). In Step 407, the MPU 35 only needs to switch channels or select a volume at a predetermined constant velocity, for example. It is also possible to allow the user to customize the constant switching velocity.

Processes of Steps 408 and 409 are the same as those of Steps 311 and 312 shown in FIG. 13.

It should be noted that in the processes of Step 405 and subsequent steps, the MPU 35 may execute Step 407 without stopping or hiding display of the real pointer 2, and execute the processes of Steps 305 to 311 shown in FIG. 13.

In this embodiment, by placing the pointer 2 on the icon 98a, 99a, 101a, or 102a displayed on the real screen 95, the user can select a selection target through a pointing operation on the virtual screen 105. In the case of this embodiment, the icons 98a, 99a, 101a, and 102a each exhibit sort of like a function as an index of a selection target.

Figure 19:
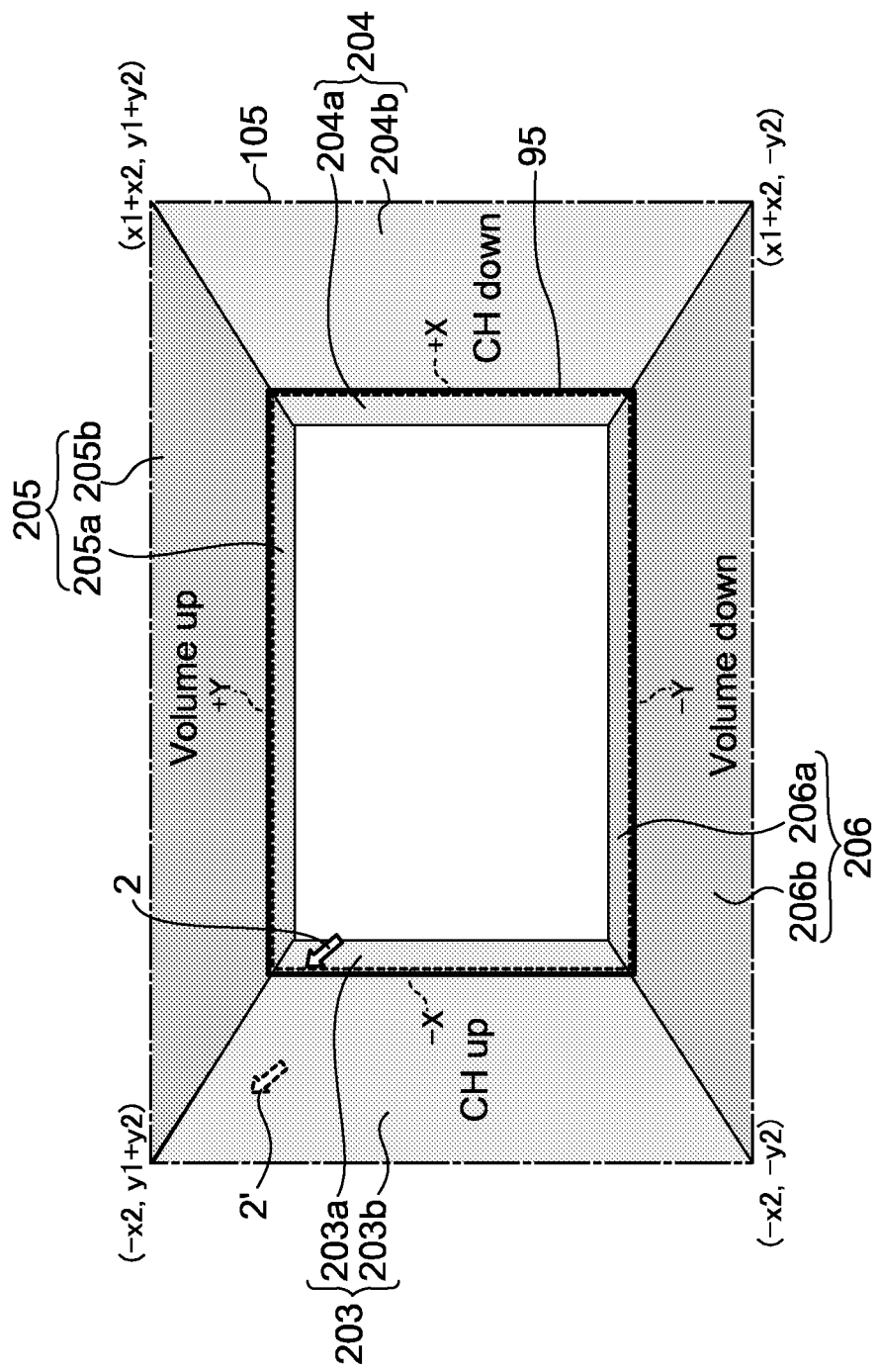
FIG. 19 A modified example of the screen shown in FIG. 17.

FIG. 19 is a modified example of the screen shown in FIG. 17.

In the configuration shown in FIG. 17, the shapes of the selection operation areas 98, 99, 101, and 102 have been rectangles partially and respectively including four corner positions of the real screen 95. Selection operations areas 203 to 206 of FIG. 19 are set to be trapezoidal so as to include entire areas of respective sides of the adjacent real screen 95. The selection operation area 203 (203a and 203b) is set in both the first and second coordinate systems across the boundary line −X. The selection operation area 204 (204a and 204b) is set in both the first and second coordinate systems across the boundary line +X. The selection operation area 205 (205a and 205b) is set in both the first and second coordinate systems across the boundary line +Y. The selection operation area 206 (206a and 206b) is set in both the first and second coordinate systems across the boundary line −Y.

The selection operation areas 203 and 204 are operation areas for channel-up and -down, respectively. The selection operation areas 205 and 206 are operation areas for volume-up and -down, respectively.

Figure 20:
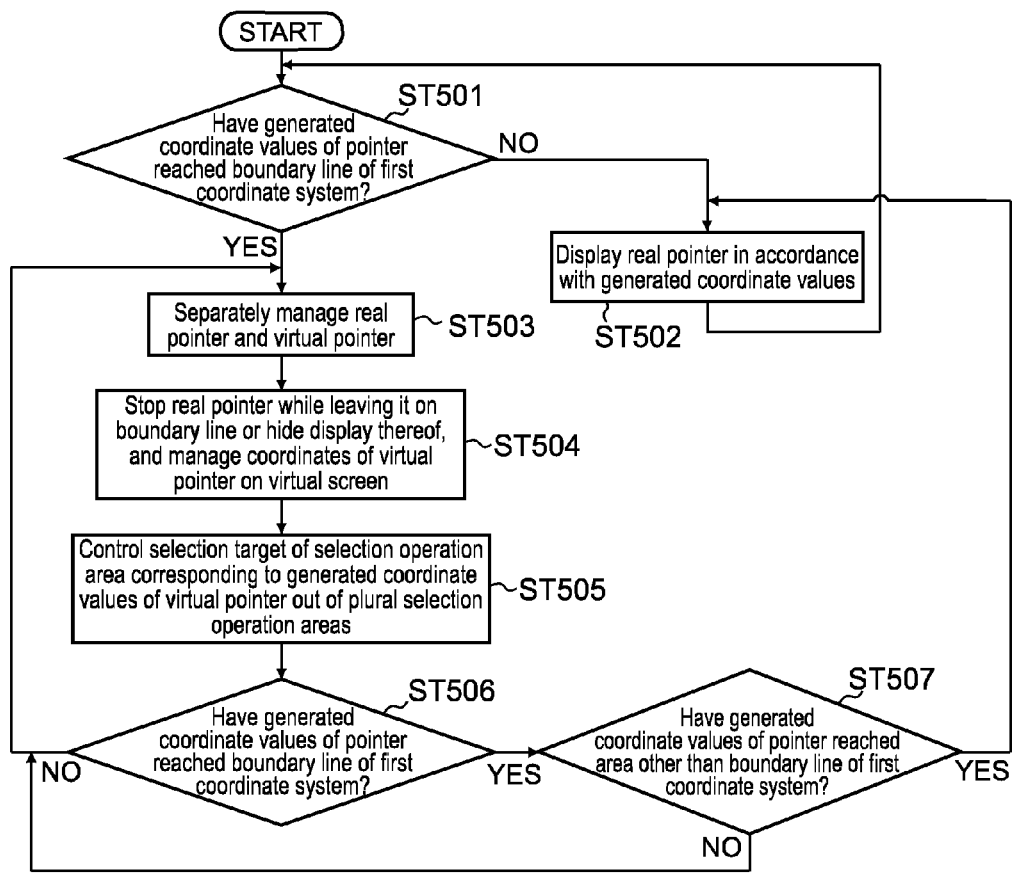
FIG. 20 A flowchart showing processing of the control apparatus on the screen shown in FIG. 19.

FIG. 20 is a flowchart showing processing of the control apparatus 40 on the screen shown in FIG. 19. In this embodiment, by the MPU 35 executing processing obtained by removing Steps 403 and 406 from the flowchart shown in FIG. 18, the same operational effect as described above can be obtained.

Figure 21:
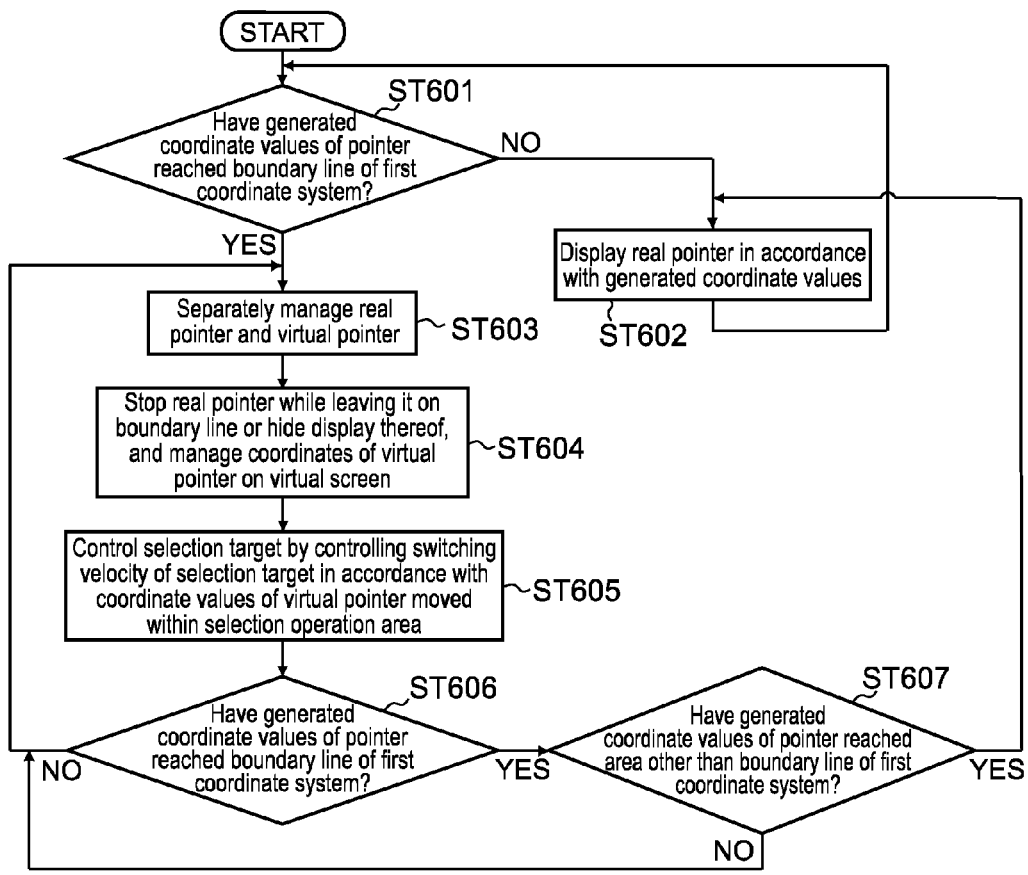
FIG. 21 A flowchart showing another processing of the control apparatus on the screen shown in FIG. 19.

FIG. 21 is a flowchart showing another processing on the screen shown in FIG. 19. In this processing flow, Step 605 is different from Step 505. In Step 505, the MPU 35 controls a selection target by variably controlling a switching velocity of a selection target in accordance with coordinate values of the virtual pointer 2' generated based on the input information generated when the user moves the input apparatus 1.

Typically, in Step 605, the user can change a speed of selecting a channel (switching velocity) or select a speed of selecting a volume (switching velocity) by moving the input apparatus 1 on the virtual screen 105. Accordingly, the user can intuitionally select a selection target with an analog operational feeling.

Figure 22:
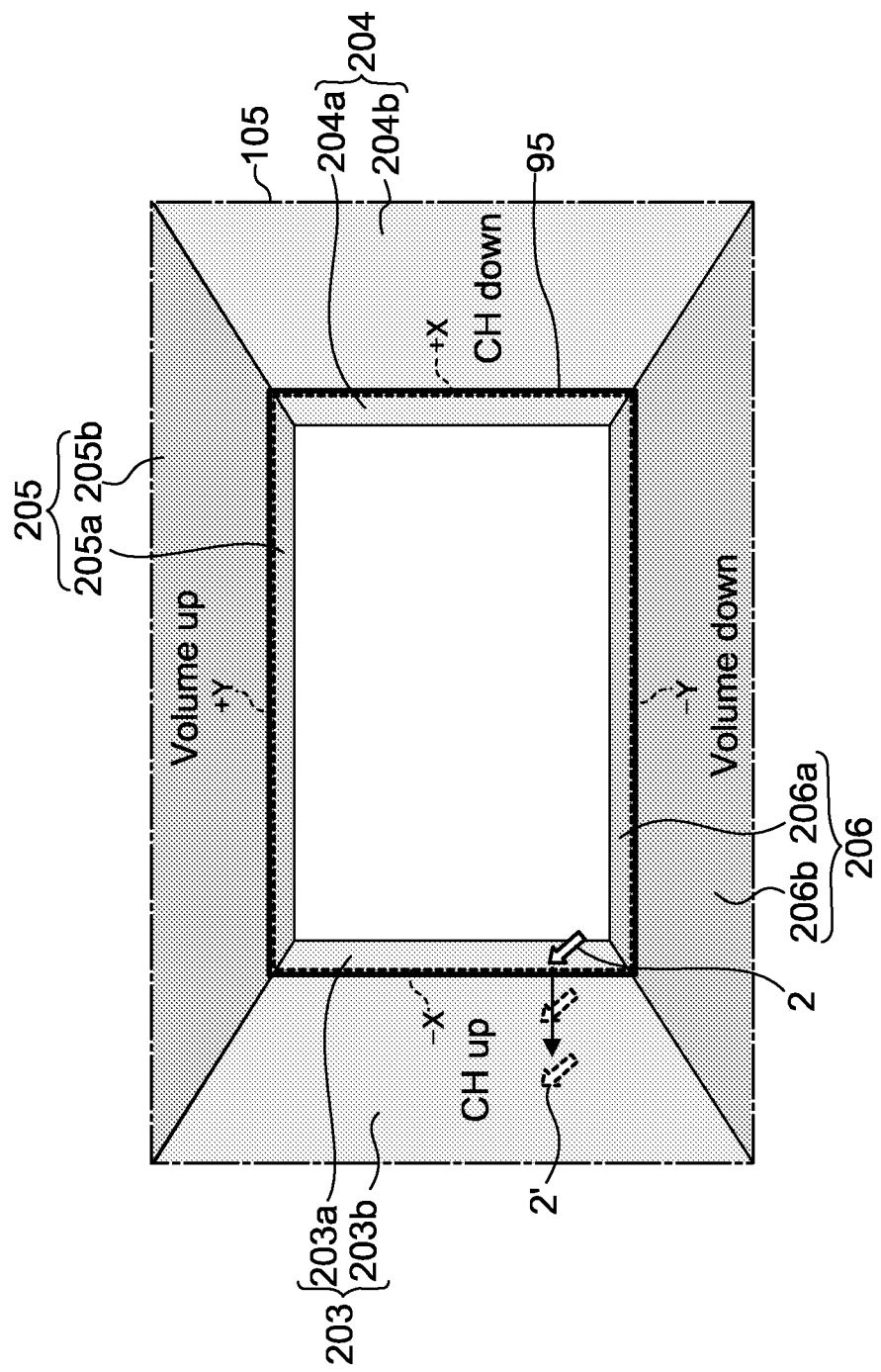
FIG. 22 A diagram of an entire screen for illustrating the processing shown in FIG. 21.

Referring to FIG. 22, typically, the MPU 35 only needs to variably control the switching velocity in accordance with a distance between the boundary line of the first coordinate system and the virtual pointer 2'. For example, the switching velocity only needs to increase (or decrease) as the virtual pointer 2' moves farther away from the boundary line. For example, regarding the selection operation area 203b, it is only necessary to variably control the channel switching velocity in accordance with a distance from the boundary line −X in the lateral direction.

The selection operation area is not limited to the configurations of the selection operation areas 98, 99, 101, 102, and 203 to 206 shown in FIGS. 17 and 19. For example, a shape, a size, a ratio of a size of one selection operation area on the real screen 95 to a size thereof on the virtual screen 105, and the like can be changed as appropriate. Alternatively, the selection operation area may be set only on the virtual screen 105.

Alternatively, selection targets in the selection operation areas 98, 99, 101, 102, and 203 to 206 are not limited to volume control and channel selection for broadcast programs and the like. For example, each of the selection targets is a target to be an item for selection of reproduction/stop of an image, selection of fast-forwarding/rewinding of an image, selection of each of images displayed flowingly on the real screen 95 (so-called scroll function), or various other selection items of a menu screen.

Also in the processing of the control apparatus 40 regarding the screen shown in FIG. 17, the MPU 35 may execute variable control of the switching velocity as in Step 505 of FIG. 20. In this case, even when the virtual pointer 2' has moved out of the selection operation area 98b (or 99b, 101b, or 102b), for example, the MPU 35 may continue the variable control.

Figure 23:
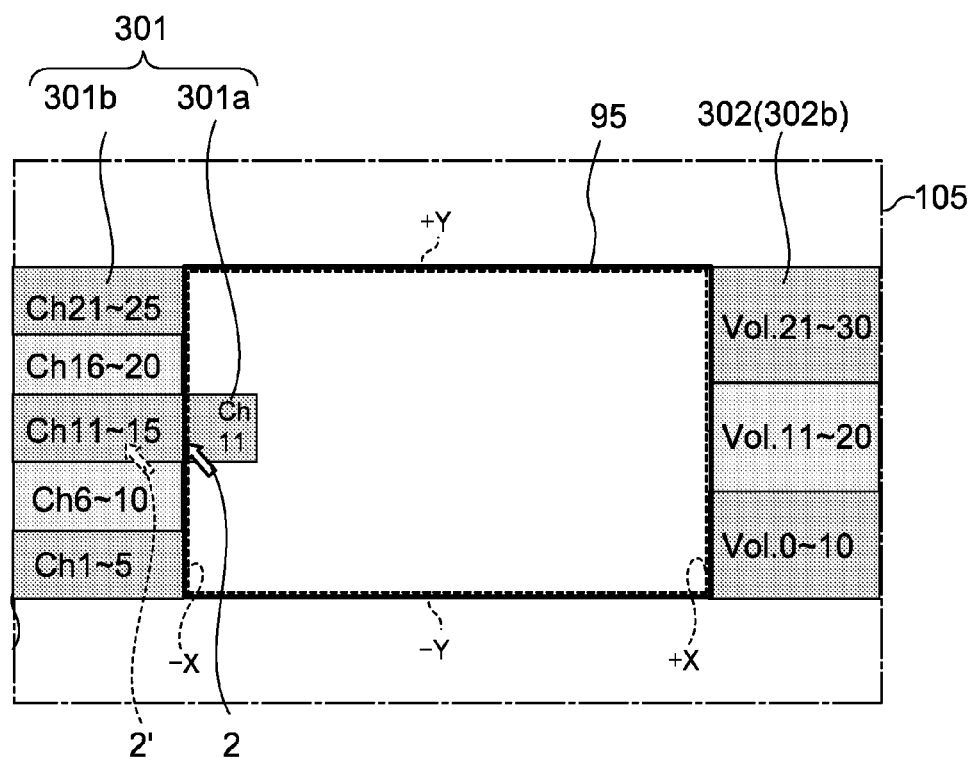
FIG. 23 A diagram showing a screen that the control apparatus causes the display apparatus to display according to another embodiment.
Figure 24:
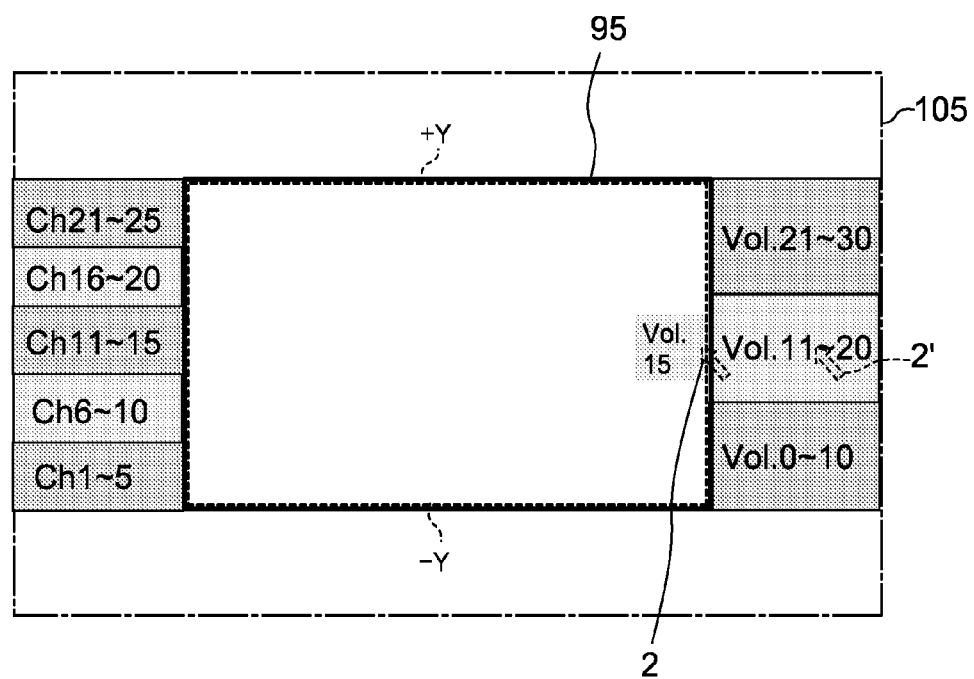
FIG. 24 A diagram showing a screen that the control apparatus causes the display apparatus to display according to another embodiment.

FIGS. 23 and 24 show another embodiment. In the embodiments shown in FIGS. 17, 19, and 22, the real display areas 98a, 99a, 101a, 102a, 203a, 204a, 205a, and 206a of icons (selection operation areas) have constantly been displayed on the real screen 95. In this embodiment, the real display areas of icons are normally not displayed on the real screen 95, and the real display area of an icon is displayed on the real screen 95 when the pointer 2' is moved to the virtual display area of the selection operation area displayed on the virtual screen 105.

Referring to FIG. 23, for example, a first selection operation area 301 is set with a virtual display area 301b on the virtual screen 105 along the boundary line −X, and a second selection operation area 302 is set with a virtual display area 302b on the virtual screen 105 along the boundary line +X.

In this embodiment, the first selection operation area 301 is constituted as a channel selection icon for television broadcasts, and the second selection operation area 302 is constituted as a volume (sound volume) adjustment icon. The virtual display area 301b of the first selection operation area 301 includes channel setting areas the setting channels of which change stepwise along the boundary line −X, and the virtual display area 302b of the second selection operation area 302 includes volume setting areas the volumes of which change stepwise along the boundary line +X.

Real display areas 301a and 302a of the first and second selection operation areas 301 and 302, respectively, are not displayed when the pointer 2 is positioned on the real screen 95. The real display areas 301a and 302a are displayed when the pointer 2 has crossed over the boundary lines −X and +X and moved to the virtual screen 105. FIG. 23 shows a state where the cursor 2 has crossed over the boundary line −X and moved to the virtual screen 105. FIG. 24 shows a state where the cursor 2 has crossed over the boundary line +X and moved to the virtual screen 105.

Based on the coordinate information of the cursor 2 (2'), the MPU 35 judges whether the cursor 2 (2') has crossed over the boundary line −X or +X and moved to the virtual screen 105. Based on the coordinate information of the virtual pointer 2' generated when crossing over the boundary line −X or +X, the MPU 35 determines the corresponding channel setting area or volume setting area. Then, the MPU 35 displays on the real screen 95 an icon indicating a corresponding setting channel or volume (real display areas 301a and 302a). The icons (real display areas 301a and 302a) are displayed adjacent to the setting areas, and icons of different display contents are displayed along the boundary lines −X and +X in accordance with a change in the y coordinate of the pointer 2 (2').

As described above, by displaying the real display areas 301a and 302a of the selection operation areas 301 and 302, respectively, only when the cursor 2 is moved to the virtual screen 105, it becomes possible to carry out display control of the selection operation areas on which an intention of a user is reflected. Moreover, since the selection operation areas 301 and 302 are not constantly displayed on the real screen 95, visibility of an image displayed on the real screen 95 can be improved.

The channel switch control and volume adjustment control may be executed simultaneous with the display of the icons (real display areas 301a and 302a) on the real screen 95, or may be executed after waiting for a button input operation to be made by the input apparatus 1 with respect to the displayed icons 301a and 302a. Moreover, the channel setting icon (real display area 301a) may be displayed simultaneously with a video received by that channel as a sub screen. The sub screen is not limited to an image of the selected channel, and images of a plurality of other channels may be displayed at the same time. In this case, a group of displayed images may be switched successively along with a vertical movement of the pointer. An image selected by an input operation of the pointer 2 is switched to a display image on the real screen 95. In this case, various display control methods such as a gradual expansion on the real screen 95 starting from the display position of an icon can be adopted.

Figure 25:
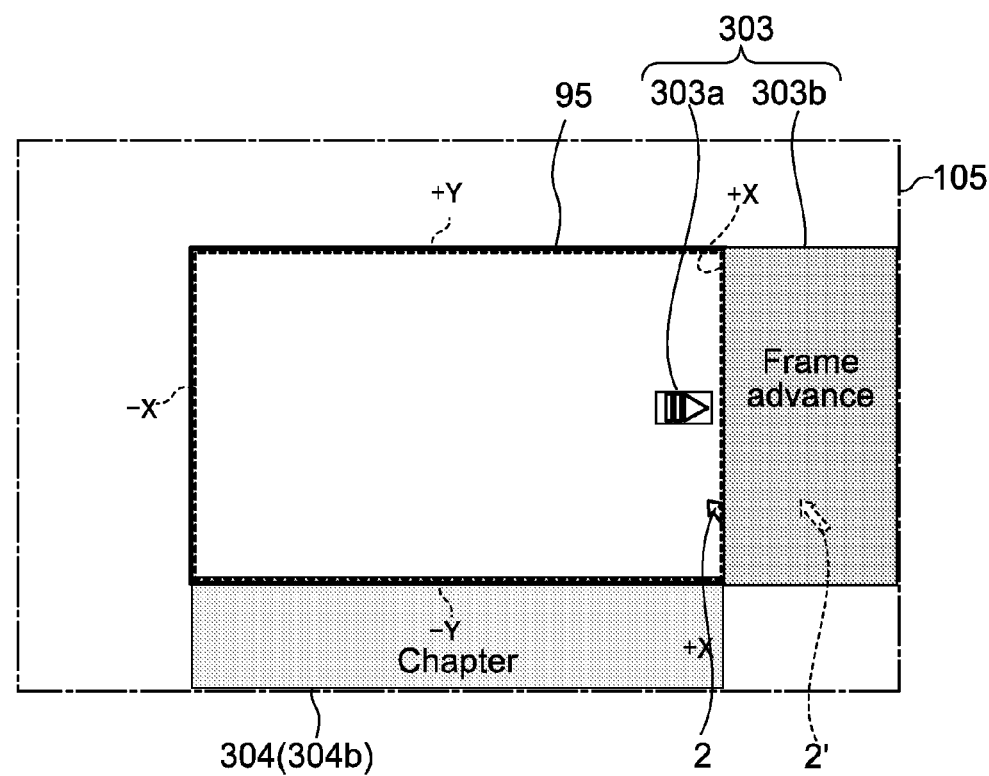
FIG. 25 A diagram showing a screen that the control apparatus causes the display apparatus to display according to another embodiment.
Figure 26:
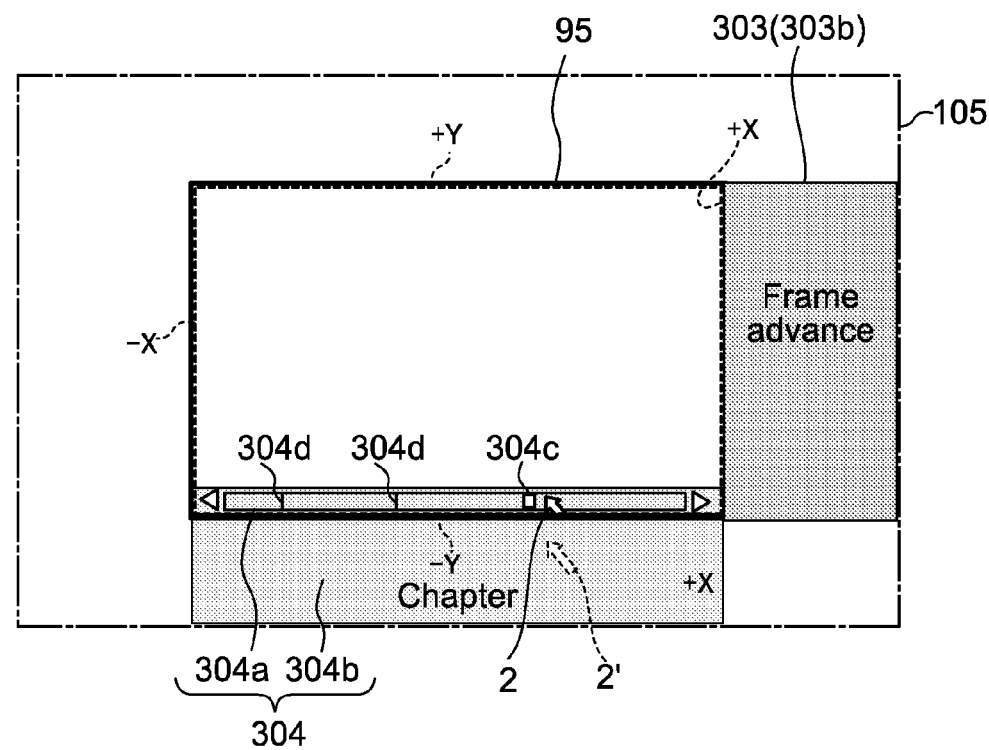
FIG. 26 A diagram showing a screen that the control apparatus causes the display apparatus to display according to another embodiment.

FIGS. 25 and 26 show a modified example of the screen shown in FIGS. 23 and 24. This embodiment shows a screen at a time of video reproduction (editing).

Also in this embodiment, the real display areas of icons are normally not displayed on the real screen 95, and the real display area of an icon is displayed on the real screen 95 when the pointer 2' is moved to the virtual display area of the selection operation area displayed on the virtual screen 105.

Referring to FIG. 25, for example, a first selection operation area 303 is set with a virtual display area 303b on the virtual screen 105 along the boundary line +X, and a second selection operation area 304 is set with a virtual display area 304b on the virtual screen 105 along the boundary line −Y. In this embodiment, the first selection operation area 303 is constituted as an icon for frame advance of a reproduction screen, and the second selection operation area 304 is constituted as an icon for setting chapters with respect to a video displayed on the real screen 95.

Real display areas 303a and 304a of the first and second selection operation areas 303 and 304, respectively, are not displayed when the pointer 2 is positioned on the real screen 95. The real display areas 303a and 304a are displayed when the pointer 2 has crossed over the boundary lines +X and −Y and moved to the virtual screen 105. FIG. 25 shows a state where the cursor 2 has crossed over the boundary line +X and moved to the virtual screen 105. FIG. 26 shows a state where the cursor 2 has crossed over the boundary line −Y and moved to the virtual screen 105.

Based on the coordinate information of the cursor 2 (2'), the MPU 35 judges whether the cursor 2 (2') has crossed over the boundary line +X or −Y and moved to the virtual screen 105. Based on the coordinate information of the virtual pointer 2' generated when crossing over the boundary line +X or −Y, the MPU 35 displays on the real screen 95 an icon displaying a frame advance operation or a chapter setting screen (real display area 303a or 304a). The icons (real display areas 303a and 304a) are displayed adjacent to the setting areas.

As described above, by displaying the real display areas 303a and 304a of the selection operation areas 303 and 304, respectively, on the real screen 95 only when the cursor 2 is moved to the virtual screen 105, it becomes possible to carry out display control of the selection operation areas on which an intention of a user is reflected. Moreover, since the selection operation areas 303 and 304 are not constantly displayed on the real screen 95, visibility of an image displayed on the real screen 95 can be improved.

The frame advance control of an image may be executed simultaneous with the display of an icon (real display area 303a) on the real screen 95, or may be executed after waiting for a button input operation to be made on the displayed icon 303a by the input apparatus 1. Moreover, in the chapter setting control, by performing an input operation on the button of the input apparatus 1 when wishing to set a chapter, chapter marks 304d are displayed on a movement path of a seek bar (slider) 304c.

In the above embodiments, the 3-dimensional operation input apparatus has been exemplified as the input apparatus 1. However, a planar operation input apparatus may be used instead. The planar operation input apparatus may be a generally-used mouse, an input apparatus that uses an arrow key used in controllers for games, or an input apparatus such as a joy stick.

In the above embodiments, the pointer 2 that moves on the screen in accordance with the movement of the input apparatus 1 has been represented as an image of an arrow. However, the image of the pointer 2 is not limited to the arrow and may be a simple circle, square, or the like, or a character image or any other images.

The pointer is not limited to that having a finite form like a so-called cursor and includes those of various configurations and with which a UI such as an icon displayed on a screen can be selected. For example, the pointer is not limited to that constantly displayed in a finite form and includes that having a configuration in which the position of the pointer becomes explicit when reaching an area in which a UI selection operation can be made.

Further, display of the pointer 2 may be changed on the boundary line between the real screen 95 and the virtual screen 105 in accordance with a change in the coordinate position of the virtual pointer 2'.

Figure 27:
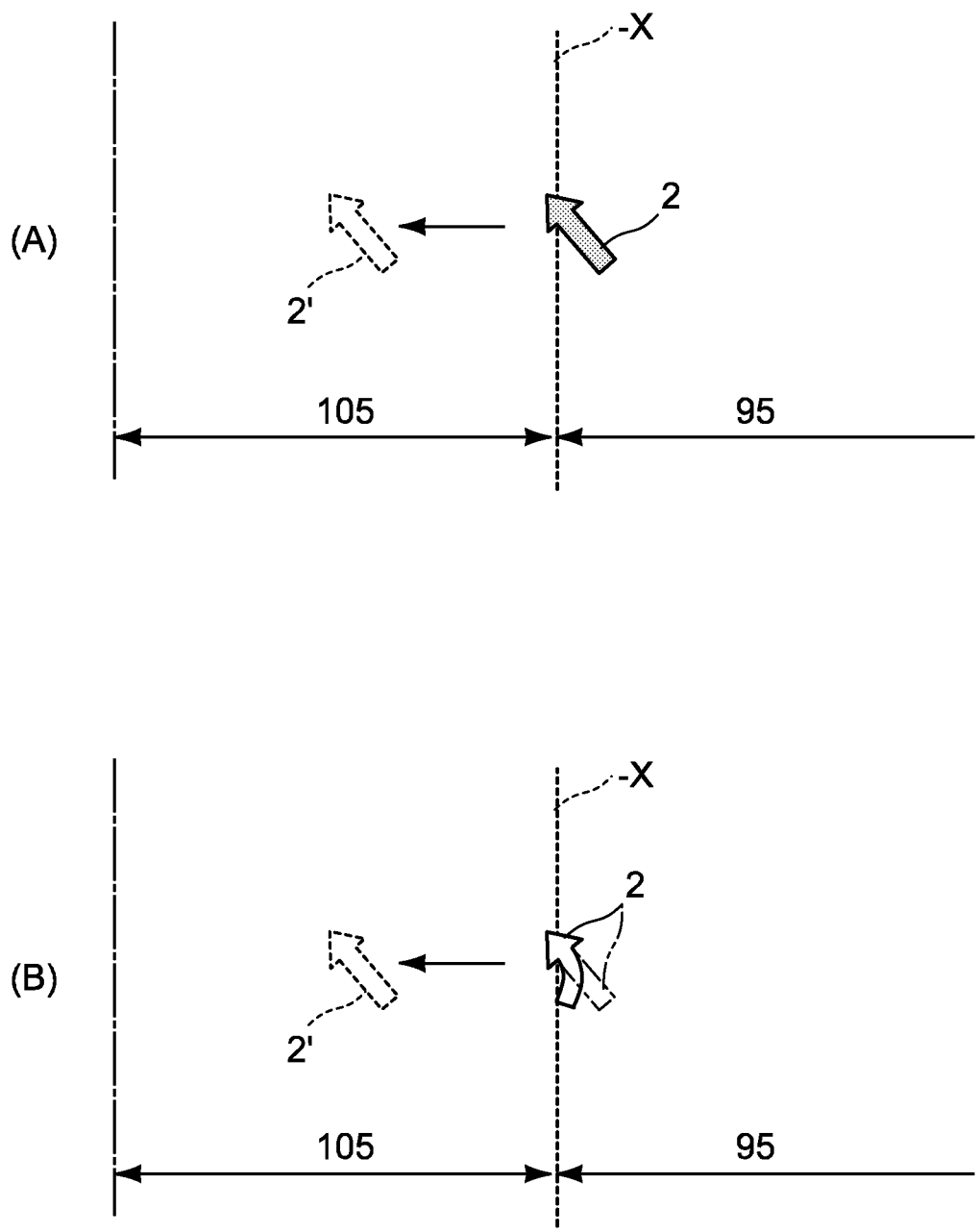
FIG. 27 Diagrams for illustrating other display examples of the pointer displayed on the screen, FIG. 27(A) showing a state where a display color of the pointer is changed and FIG. 28(B) showing a state where a shape of the pointer is changed.

For example, as shown in FIG. 27(A), a display color of the pointer 2 can be changed on the boundary line (boundary line −X in the example shown in the figure) in accordance with the position of the virtual pointer 2'. For example, the display color of the pointer changes from white to green when reaching the boundary line. The change in the display color includes a change of luminance or concentration of the display color as the virtual pointer 2' moves farther away from the real screen 95, or the like.

Alternatively, as shown in FIG. 27(B), a form of the pointer 2 on the boundary line can be changed in accordance with the position of the virtual pointer 2'. In the example shown in the figure, a state where an axis portion of the pointer 2 is bent toward the virtual screen 105 is shown. The change in the form of the pointer 2 also includes a tilt and a deformation such as squashing of the pointer 2. A deformation amount of the pointer 2 can be increased as the virtual pointer 2' moves farther away from the real screen 95.

Accordingly, it becomes possible for the user to recognize that the pointer is positioned on the virtual screen and where on the virtual screen the pointer is positioned. As another example of the change in the form of the pointer, there is an animation of the pointer 2 such as display of a state where the pointer 2 is running toward the virtual screen.

The shapes of the real screen 95 and the virtual screen 105 displayed on the display apparatus 5 have been a rectangle. However, the shape of the real screen 95 may be a triangle, a polygon of a pentagon or more, a circle, an oval, or a combination of at least two of the above. Similarly, the virtual screen 105 may be of various shapes. The shapes of the real screen 95 and the virtual screen 105 may differ.

In the descriptions above, the coordinate systems of the real screen 95 and the virtual screen 105 have been a Cartesian coordinate system. However, the coordinate system(s) of the real screen and/or the virtual screen may be a polar coordinate system.

In the descriptions above, the real screen 95 and the virtual screen 105 have been a plane. However, the real screen and/or the virtual screen may have a curved surface.

Although scales of the first and second coordinate systems have typically been substantially the same in the descriptions above, they may be different.

In the processing shown in FIG. 13, display control has been performed such that the real pointer 2 moves on the boundary line while the MPU 35 is generating coordinate values of the virtual pointer 2', that is, while the virtual pointer 2' is moving on the virtual screen. However, it is also possible for the MPU 35 to execute processing uncorrelated to the input information from the input apparatus 1 while generating the coordinate values of the virtual pointer 2'. The uncorrelated processing includes processing of hiding display of the pointer, processing of displaying and hiding the pointer (blinking), processing of stopping the pointer on the real screen, processing of changing the pointer to a specific symbol or figure, processing of making the pointer make a specific movement regardless of the input information, and the like. The same holds true for the processing of FIGS. 18, 20, and 21.

In the processing of FIGS. 9 and 10, the control apparatus 40 has generated the coordinate values of the pointer. However, it is also possible for the input apparatus 1 to generate the coordinate values of the pointer and transmit coordinate information to the control apparatus 40 or transmit a display control signal based on the generated coordinate information to the display apparatus 5.

There is also a case where the input apparatus 1 includes the acceleration sensor unit 16 but not the angular velocity sensor unit 15. In this case, the velocity values $(V_x, V_y)$ can be obtained in Step 103 by integrating the acceleration values $(a_x, a_y)$ detected by the acceleration sensor unit 16 (provided that in this case, angular velocity values $(\omega_\psi, \omega_\theta)$ about the Y axis and X axis cannot be obtained). Accelerations may be calculated by an image sensor instead of the acceleration sensor unit 16.

An angle sensor or an angular acceleration sensor may be used instead of the angular velocity sensor unit 15. Examples of the angle sensor include a geomagnetic sensor and an image sensor. Change amounts of angle values are detected when using, for example, triaxial geomagnetic sensors. Thus, in this case, the angle values are differentiated to thus obtain angular velocity values. The angular acceleration sensor is constituted as a combination of a plurality of acceleration sensors, and the angular velocity values are obtained by integrating angular acceleration values obtained by the angular acceleration sensor. In terms of such embodiments, mainly the MPU 19 or 35 functions as a calculation means for outputting angle-related values as values related to angles.

For example, the angular acceleration sensor for detecting angular accelerations about the Y axis and the X axis or a sensor for detecting angles may be used in calculating radius gyrations R(t) as described above. In this case, the angular velocity values $(\omega_\psi, \omega_\theta)$ are obtained by integrating the angular acceleration values detected by the angular acceleration sensor. Alternatively, the angular velocity values $(\omega_\psi, \omega_\theta)$ are obtained by differentiating the angle values detected by the angle sensor.

As a uniaxial angular acceleration sensor as the angular acceleration sensor above, two uniaxial acceleration sensors disposed on the radius gyrations R(t) are typically used. A difference between two acceleration values obtained by the two acceleration sensors is divided by a distance between the two acceleration sensors to thus calculate an angular velocity value of the input apparatus 1 or the like. Similar to the detection principle of the two uniaxial acceleration sensors described above, two biaxial acceleration sensors only need to be used as the biaxial angular acceleration sensor. In this case, in addition to the geomagnetic sensor and the image sensor, the biaxial acceleration sensors only need to be used as the angle sensor so as to realize a principle of obtaining, for example, a roll angle $\phi$ (angle about Z axis in FIG. 8). Therefore, the two biaxial acceleration sensors only need to be used for detecting biaxial angles about the Y axis and the X axis.

In the input apparatus of the above embodiments, input information has been transmitted to the control apparatus wirelessly. However, the input information may be transmitted by wire.

The embodiments may be applied to, for example, a handheld-type information processing apparatus (handheld apparatus) including a display section. In this case, by the user moving a main body of the handheld apparatus, a pointer displayed on the display section is moved. Examples of the handheld apparatus include a PDA (Personal Digital Assistance), a cellular phone, a portable music player, and a digital camera.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A control apparatus for controlling display of a pointer based on input information including a three-dimensional movement amount of an input apparatus, the control apparatus comprising:
 a generation means for generating first coordinate information indicating a position of the pointer by integrating the movement amount of the input apparatus in a first coordinate system corresponding to a real screen, and second coordinate information indicating a virtual position of the pointer by integrating the movement amount of the input apparatus in a second coordinate system corresponding to a virtual screen associated with the first coordinate system;
 a display control means for controlling the display of the pointer on the real screen in accordance with the first coordinate information and the second coordinate information that have been generated;
 a storage means for storing a virtual display area on the virtual screen out of a selection operation area as a target of a selection operation by the input apparatus, the virtual display area being stored in association with the second coordinate system;
 a judgment means for judging whether the generated second coordinate information is within the virtual display area; and
 a selection control means for controlling the target of the selection operation when the generated second coordinate information is within the virtual display area.

2. The control apparatus according to claim 1,
wherein the display control means generates image data of a real display area on the real screen adjacent to the virtual display area out of the selection operation area.

3. The control apparatus according to claim 2,
wherein the display control means displays the real display area on the real screen when the judgment means judges that the second coordinate information is within the virtual display area.

4. The control apparatus according to claim 1,
wherein the selection control means variably controls a switching velocity in the selection operation in accordance with a distance between the generated second coordinate information and a boundary line at an end portion of the first coordinate system, the boundary line being a boundary between the first coordinate system and the second coordinate system.

5. The control apparatus according to claim 1,
wherein the storage means stores the virtual display area of the selection operation area that is provided plurally, the plurality of virtual display areas being stored in association with the second coordinate system.

6. The control apparatus according to claim 1, further comprising:
 a reception means for receiving a command signal output in accordance with a button operation of the input apparatus; and
 a correction means for causing the position of the pointer to correspond to a predetermined reference position on the real screen based on the received command signal.

7. The control apparatus according to claim 6,
wherein the display control means temporarily displays the pointer with emphasis when the pointer is displayed at the reference position.

8. A control apparatus for controlling display of a pointer based on input information including a three-dimensional movement amount of an input apparatus, the control apparatus comprising:
 a generation means for generating first coordinate information indicating a position of the pointer by integrating the movement amount of the input apparatus in a first coordinate system corresponding to a real screen, and second coordinate information indicating a virtual position of the pointer by integrating the movement amount of the input apparatus in a second coordinate system corresponding to a virtual screen associated with the first coordinate system; and
 a display control means for controlling the display of the pointer on the real screen in accordance with the first coordinate information and the second coordinate information that have been generated,
 wherein the display control means controls the display of the pointer so that, when the input information is changed from a first input value that corresponds to a position on a boundary line at an end portion of the first coordinate system, the boundary line being a boundary between the first coordinate system and the second coordinate system, to a second input value that corresponds to a position in an area of the second coordinate system adjacent to the boundary line, the pointer is displayed on the boundary line.

9. The control apparatus according to claim 8,
wherein the display control means controls the display of the pointer so that the pointer moves on the boundary line by updating the first coordinate values on the boundary line in accordance with the second coordinate information generated by the generation means.

10. The control apparatus according to claim 8,
wherein the display control means changes a display form of the pointer on the boundary line in accordance with a change in the second input value.

11. A control apparatus for controlling display of a pointer based on input information including a three-dimensional movement amount of an input apparatus, the control apparatus comprising:
 a generation means for generating first coordinate information indicating a position of the pointer by integrating the movement amount of the input apparatus in a first coordinate system corresponding to a real screen, and second coordinate information indicating a virtual position of the pointer by integrating the movement amount of the input apparatus in a second coordinate system corresponding to a virtual screen associated with the first coordinate system; and
 a display control means for controlling the display of the pointer on the real screen in accordance with the first coordinate information and the second coordinate information that have been generated,
 wherein the display control means generates a signal for executing processing for setting a state of the pointer to be uncorrelated to the input information when the input information is changed from a first input value of the input information that indicates that the pointer is positioned in the first coordinate system to a second input value of the input information that indicates that the pointer is positioned in the second coordinate system.

12. The control apparatus according to claim 11, wherein the processing uncorrelated to the input information includes processing of stopping the pointer on the real screen.

13. A control apparatus for controlling display of a pointer based on input information including a three-dimensional movement amount of an input apparatus, the control apparatus comprising:
   a generation means for generating first coordinate information indicating a position of the pointer by integrating the movement amount of the input apparatus in a first coordinate system corresponding to a real screen, and second coordinate information indicating a virtual position of the pointer by integrating the movement amount of the input apparatus in a second coordinate system corresponding to a virtual screen associated with the first coordinate system;
   a display control means for controlling the display of the pointer on the real screen in accordance with the first coordinate information and the second coordinate information that have been generated;
   a judgment means for judging whether the generated first coordinate information is on a boundary line at an end portion of the first coordinate system, the boundary line being a boundary between the first coordinate system and the second coordinate system; and
   a start means for causing the generation means to start generating the second coordinate information when the first coordinate information is on the boundary line.

14. A control apparatus for controlling display of a pointer based on input information including a three-dimensional movement amount of an input apparatus, the control apparatus comprising:
   a generation means for generating first coordinate information indicating a position of the pointer by integrating the movement amount of the input apparatus in a first coordinate system corresponding to a real screen, and second coordinate information indicating a virtual position of the pointer by integrating the movement amount of the input apparatus in a second coordinate system corresponding to a virtual screen associated with the first coordinate system; and
   a display control means for controlling the display of the pointer on the real screen in accordance with the first coordinate information and the second coordinate information that have been generated,
   wherein the input apparatus is a three-dimensional operation input apparatus that generates a velocity value of the input apparatus based on at least one of an acceleration value of the input apparatus and an angular velocity value of the input apparatus and transmits information on the velocity value,
   the control apparatus further comprising:
   a reception means for receiving the transmitted information on the velocity value as the input information.

15. A control apparatus for controlling display of a pointer based on input information including a three-dimensional movement amount of an input apparatus, the control apparatus comprising:
   a generation means for generating first coordinate information indicating a position of the pointer by integrating the movement amount of the input apparatus in a first coordinate system corresponding to a real screen, and second coordinate information indicating a virtual position of the pointer by integrating the movement amount of the input apparatus in a second coordinate system corresponding to a virtual screen associated with the first coordinate system; and
   a display control means for controlling the display of the pointer on the real screen in accordance with the first coordinate information and the second coordinate information that have been generated,
   wherein the input apparatus is a three-dimensional operation input apparatus that transmits information on at least one of an acceleration value of the input apparatus and an angular velocity value of the input apparatus,
   the control apparatus further comprising:
   a reception means for receiving the transmitted information on at least one of the acceleration value and the angular velocity value; and
   a calculation means for calculating a velocity value of the input apparatus based on the received information on at least one of the acceleration value and the angular velocity value,
   wherein the generation means generates the first coordinate information and the second coordinate information that correspond to the input information while using information on the calculated velocity value as the input information.

16. An input apparatus controlling display of a pointer, comprising:
   a casing;
   an input information generation means for detecting a three-dimensional movement of the casing and generating input information including an amount of the movement of the casing;
   a generation means for generating first coordinate information indicating a position of the pointer by integrating the movement amount of the casing in a first coordinate system corresponding to a real screen, and second coordinate information indicating a virtual position of the pointer by integrating the movement amount of the casing in a second coordinate system corresponding to a virtual screen associated with the first coordinate system;
   a display control means for controlling the display of the pointer on the real screen in accordance with the first coordinate information and the second coordinate information that have been generated;
   a storage means for storing a virtual display area on the virtual screen out of a selection operation area as a target of a selection operation by the input apparatus, the virtual display area being stored in association with the second coordinate system;
   a judgment means for judging whether the generated second coordinate information is within the virtual display area; and
   a selection control means for controlling the target of the selection operation when the generated second coordinate information is within the virtual display area.

17. A control system controlling display of a pointer, comprising:
   an input apparatus including:
      a casing,
      an input information generation means for detecting a three-dimensional movement of the casing and generating input information including an amount of the movement of the casing, and a transmission means for transmitting the input information; and a control apparatus including:

a generation means for generating first coordinate information indicating a position of the pointer by integrating the movement amount of the casing in a first coordinate system corresponding to a real screen, and second coordinate information indicating a virtual position of the pointer by integrating the movement amount of the casing in a second coordinate system corresponding to a virtual screen associated with the first coordinate system, a display control means for controlling the display of the pointer on the real screen in accordance with the first coordinate information and the second coordinate information that have been generated, a storage means for storing a virtual display area on the virtual screen out of a selection operation area as a target of a selection operation by the input apparatus, the virtual display area being stored in association with the second coordinate system, a judgment means for judging whether the generated second coordinate information is within the virtual display area, and a selection control means for controlling the target of the selection operation when the generated second coordinate information is within the virtual display area.

18. A control method controlling display of a pointer based on input information corresponding to a three-dimensional movement of an input apparatus, comprising:

generating first coordinate information indicating a position of the pointer by integrating an amount of the movement of the casing in a first coordinate system corresponding to a real screen;

generating second coordinate information indicating a virtual position of the pointer by integrating the movement amount of the casing in a second coordinate system corresponding to a virtual screen associated with the first coordinate system;

controlling the display of the pointer on the real screen in accordance with the first coordinate information and the second coordinate information that have been generated;

storing a virtual display area on the virtual screen out of a selection operation area as a target of a selection operation by the input apparatus, the virtual display area being stored in association with the second coordinate system;

judging whether the generated second coordinate information is within the virtual display area; and controlling the target of the selection operation when the generated second coordinate information is within the virtual display area.

19. A handheld apparatus comprising:

a casing;

a display section;

an input information generation means for detecting a three-dimensional movement of the casing and generating input information including an amount of the movement of the casing;

a generation means for generating first coordinate information indicating a position of the pointer by integrating the movement amount of the casing in a first coordinate system corresponding to a real screen, and second coordinate information indicating a virtual position of the pointer by integrating the movement amount of the casing in a second coordinate system corresponding to a virtual screen associated with the first coordinate system;

a display control means for controlling display of the pointer on the real screen in accordance with the first coordinate information and the second coordinate information that have been generated;

a storage means for storing a virtual display area on the virtual screen out of a selection operation area as a target of a selection operation by the input apparatus, the virtual display area being stored in association with the second coordinate system;

a judgment means for judging whether the generated second coordinate information is within the virtual display area; and a selection control means for controlling the target of the selection operation when the generated second coordinate information is within the virtual display area.

* * * * *